United States Patent
Beard et al.

(10) Patent No.: US 6,498,611 B1
(45) Date of Patent: Dec. 24, 2002

(54) SYSTEM AND METHOD FOR PROVIDING A VIRTUAL OPERATOR PANEL FOR A PERIPHERAL DEVICE

(75) Inventors: Eric Andrew Beard, Lexington, KY (US); Robert Jerome Borchers, II, Florence, KY (US); Evan Glenn Goldey, Lexington, KY (US); Craig Anthony Rudolph, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/493,525

(22) Filed: Jan. 28, 2000

(51) Int. Cl.⁷ .................................................. G06F 9/00
(52) U.S. Cl. ........................................ 345/752; 345/805
(58) Field of Search .................................. 345/764, 781, 345/797, 761, 804, 805, 808, 752; 358/1.13, 1.14, 1.15

(56) References Cited

U.S. PATENT DOCUMENTS 4,698,755 A    10/1987    Okazaki (List continued on next page.)

*Primary Examiner*—Cao H. Nguyen
(74) *Attorney, Agent, or Firm*—John A. Brady

(57) ABSTRACT

A system and method for providing a virtual operator panel for a peripheral device where the system includes a peripheral device including a processor and a data store that stores public settings corresponding to private settings of the peripheral device, each public setting indicative of at least one private setting of the peripheral device. The peripheral device has a device process and a host process, or alternately, is in bidirectional communication with at least one host computer including a data store, a display and a processor. The host computer or host process selectively transmits a request to the peripheral device or device process requesting public settings of the peripheral device for the generation of a virtual operator panel for the peripheral device. The peripheral device or device process receives the request for peripheral device settings from the host computer or host process, and transmits a response including at least one public setting from the data store of the peripheral device, and the host computer or host process receives the response from the peripheral device and generates a virtual operator panel based upon the response. In one embodiment, the public setting is a metavariable that implicates one or more local variables of the peripheral device. There is also provided a method for generating a virtual operator panel for a peripheral device including the steps of transmitting a request for peripheral device public settings from a host computer or host process to a peripheral device or device process, receiving the request at the peripheral device or device process, generating a response in the peripheral device or device process that includes at least one public setting of the peripheral device, transmitting the response from the peripheral device or device process to the host computer or host process, receiving the response at the host computer or host process, and generating a functional virtual operator panel based upon the public setting included in the received response.

40 Claims, 9 Drawing Sheets

U.S. PATENT DOCUMENTS

| | | |
|---|---|---|
| 4,926,347 A | 5/1990 | Uchida et al. |
| 4,965,771 A | 10/1990 | Morikawa et al. |
| 4,989,163 A | 1/1991 | Kawamata et al. |
| 5,025,398 A | 6/1991 | Nelson |
| 5,121,113 A | 6/1992 | Kedge et al. |
| 5,283,861 A | 2/1994 | Dangler et al. |
| 5,323,393 A | 6/1994 | Barrett et al. |
| 5,332,320 A | 7/1994 | Ohara |
| 5,390,004 A | 2/1995 | Hopkins |
| 5,550,957 A | 8/1996 | Davidson, Jr. et al. |
| 5,603,060 A | 2/1997 | Weinberger et al. |
| 5,636,332 A | 6/1997 | Hibino |
| 5,638,497 A | 6/1997 | Kimber et al. |
| 5,694,618 A | 12/1997 | Hibino |
| 5,696,891 A | 12/1997 | Ide |
| 5,699,494 A | 12/1997 | Colbert et al. |
| 5,712,978 A | 1/1998 | Lerner et al. |
| 5,720,015 A | 2/1998 | Martin et al. |
| 5,727,135 A * | 3/1998 | Webb et al. ............... 358/1.15 |
| 5,751,430 A | 5/1998 | Koike |
| 5,760,812 A | 6/1998 | Hopkins |
| 5,774,678 A | 6/1998 | Motoyama |
| 5,799,206 A | 8/1998 | Kitagawa et al. |
| 5,819,015 A | 10/1998 | Martin et al. |
| 5,825,336 A | 10/1998 | Fujita et al. |
| 5,835,713 A | 11/1998 | FitzPatrick et al. |
| 5,838,887 A | 11/1998 | Murakami |
| 6,148,346 A * | 11/2000 | Hanson ..................... 709/321 |
| 6,268,924 B1 * | 7/2001 | Koppolu et al. ........... 358/1.13 |

\* cited by examiner

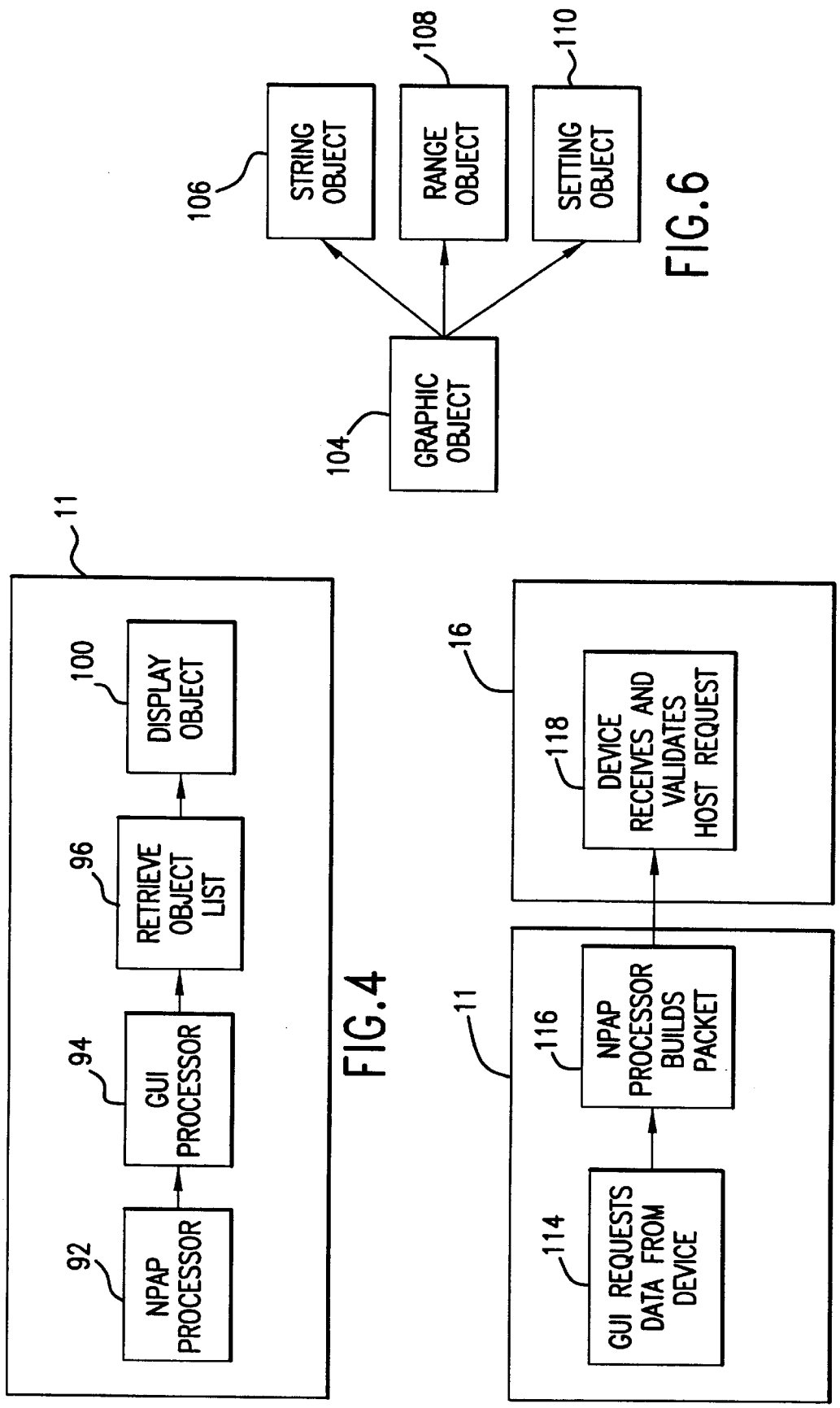

SAMPLE

| META_VARIABLE | SETTING #1 | SETTING #2 | ... | SETTING #n |
|---|---|---|---|---|
| META_SETTING#1 | SETTING#1_VALUEa | SETTING#2_VALUEd | - | SETTING#n_VALUEx |
| META_SETTING#2 | SETTING#1_VALUEc | SETTING#2_VALUEe | - | SETTING#n_VALUEz |
| META_SETTING#3 | SETTING#1_VALUEb | SETTING#2_VALUEf | - | SETTING#n_VALUEy |
| END OF TABLE MARKER | EOT MARKER | EOT MARKER | - | EOT MARKER |

OPTRA COLOR C710

| NVMETA_PRNTQUALITY | NPA_NVRESOLUTIONX | NPA_NVRESOLUTIONY |
|---|---|---|
| NVMETA_PQ600DPI | NV600DPI | NV600DPI |
| NVMETA_PQ1200QUALITY | NV1200DPI | NV1200DPI |
| -1 | -1 | -1 |

OPTRA W810

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| NVMETA_PQ1200QUALITY | NV1200DPI | NV1200DPI | -1 |
| -1 | -1 | -1 | -1 |

OPTRA_T*

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| NVMETA_PQ1200QUALITY | NV1200DPI | NV1200DPI | NV_OFF |
| -1 | -1 | -1 | SPLAT |
|  |  |  | -1 |

FIG.11

SYSTEM AND METHOD FOR PROVIDING A VIRTUAL OPERATOR PANEL FOR A PERIPHERAL DEVICE

BACKGROUND OF THE INVENTION

1. Field of the Invention

The present invention generally relates to computer systems. More particularly, the present invention relates to a system and method to provide a virtual operator panel for a peripheral device in connection with one or more host computers where the specific settings for the peripheral device are unknown to the host computer.

2. Description of the Related Art

Computers and common peripheral devices such as modems, printers, and displays are connected in communication such that a computer, generally referred to as the host, can send data and receive data from the peripheral devices and other computers. The communication channel between the computer(s) and devices may be either unidirectional, such that one computer or peripheral device only sends or only receives data to another, or bidirectional, with each device both sending and receiving data. In either instance, one computer or peripheral device can serve either single or multiple hosts which is dependent upon the operational capabilities of the devices.

A typical device-host connection is a cable connected directly to the serial or parallel port of both the host and the peripheral device such that the peripheral device primarily serves the connected host. Alternatively, a computer and peripheral device are connected in a network and each device is accessible to and can interface with multiple hosts residing on that network. In order to properly interface, the computer(s) and peripheral device(s) must have a known data protocol between them whereby each device can understand the data from one another.

The interface protocol is particularly important in host-peripheral device applications in which the host is controlling the peripheral device to perform a function. The data passed from the host to the peripheral must be very specific in the desired function, and often, the peripheral device will communicate with the host to inform the host of the properties and functions of the peripheral device. An example of such interface is that between a computer as the host device and a printer as the peripheral device through a known protocol such as the Network Printer Alliance Protocol (NPAP).

A printer has numerous setting capabilities, a few examples being paper size, font, and paper type, which are often changed for every single print job requested by a host computer. Furthermore, prior art printers have the capability to send data back to the host computer indicative of various parameters of the printer, such as job in progress, paper jam, paper tray status, and printing errors. Thus, when the computer and printer are interfaced, they pass the above data regarding the print jobs and printer status through data variables that reflect the attributes of one parameter. And when the attributes of printing parameter are desired to be changed, the computer sends specific variables to the printer and each variable changes one parameter of the printer. Given the significant number of parameters for the printer and the specific control desired by the host computer, several problems are recurrent in the, host computer-peripheral device interface.

The host computer and peripheral device can be unaware of the all of the variables for different parameters the other devices, such as the variables for specific printer settings and capabilities, or the inter-relationship between different variables and their related parameters and functions. Accordingly, when a printer attempts to provide this "self-descriptive" data, such as configuration data, to a host computer, or when the host computer attempts to change several settings in the printer, the variables utilized may not effectively communicate all parameters of the devices. Because of this inadequate communication between inter-faced devices in prior art systems, hosts and peripheral devices have been unable to easily provide conceptual settings to a user, such as "print quality" or "page layout."

Moreover, either the host or the peripheral device may need to update many variable settings on their underlying hardware for proper functioning, especially through upgrades and changes in software. To correctly update the variables, the host must have advance knowledge of the variables and their interdependence to even allow the user to change the variables. Further, other problems can occur because subsequent code releases in the device tend to change those interdependencies by changing the settings of the individual variables or adding new dependencies. Even though the device may be aware of the new interdependencies, if the dependencies are not easily stored and communicated to other systems in the device, confusion and extra development time may result as those variables are changed.

More recently, in an attempt to provide low-cost peripheral devices, such as printers, expensive components such as LCD displays or specific control buttons are often excluded. The control buttons or display provides the simplest manner for the user to configure the device. Thus, to overcome the lack of a specific button or display to directly actuate the settings for the peripheral device, several devices provide an electronic (virtual) replica of an operator panel for the peripheral device, typically upon the display screen of a host computer. However, there are several problems with existing virtual operator panels.

A typical virtual operator panel allows a host utility to display a replica of the device panel, but without providing improved functionality, and only duplicate the existing display of the peripheral device. Another problem arises in that when the peripheral device includes advanced or complicated settings and the representations of which would clutter the virtual operator panel and confuse a novice user. A further problem occurs when the peripheral device must be configured with settings that can not be easily entered at the peripheral device, and example being settings that require alphabetic characters that are not easily represented without an alphanumeric keyboard., Such problems leave the user or customer engineer unable to easily configure or check on the configuration of the peripheral device from a remote location or at the device itself.

Currently, host computers attempt to provide access to the peripheral device settings with several limitations. The host computer must know in advance the valid values for each setting in lo the peripheral device, and the meaning of each value if a textual representation is required. The host computer must also know translated strings if the peripheral device is to provide multi-language support. Furthermore, the host computer must know all settings in the device, and the default values for each setting which can be represented.

These requirements to provide a virtual operator panel challenge the host programmer. Although most printers support similar emulations, they do not all support a common language. Another challenge is that the specific value can change from device to device and potentially from code release to code release of the peripheral device. This means the host computer must keep track of the values on a device by device basis, and sometimes a code level by code level basis, which is commonly accomplished through software updates. This update is critical because setting an incorrect value on the peripheral device at least results in the user not getting the desired setting, and possibly can causes the peripheral device to crash.

Unfortunately, a crash resulting from an incorrect settings might not occur immediately and the user will not make a connection between setting the value for the peripheral device and the crash. Such a crash results in additional cost to the company in the form of support calls, on-site service or lost sales due to unsatisfied customers, and can cause economic impairment for the customer.

Accordingly, to provide an accurate and effective virtual operator panel for a peripheral device, the capability to understand the interdependencies between public settings and private settings of the peripheral device must exist at both the host computer and the device. Furthermore, the public/private settings relationships frequently change and if one device were not properly updated, the virtual operator panel would either fail or misrepresent the settings and variables of the peripheral device. The prior art systems thus provide an unsatisfactory interface between host computers and peripheral devices to provide a virtual operator panel, and particularly host computers and printers, as complex data and commands with variables is limited and prone to error through versions of the peripheral device. A system that allows improved communication to provide a virtual operator panel would therefore represent an improvement over the prior art computer-peripheral device interface systems. It is to the provision of such an improved system and method that the present invention is primarily directed.

SUMMARY OF THE INVENTION

The present invention, in one embodiment, is a system for providing a virtual operator panel for a peripheral device in an interface with a host computer, where the system includes a peripheral device having a processor and a data store that stores peripheral device settings including one or more public settings where each public setting is indicative of one or more private settings of the peripheral device, and at least one host computer in bidirectional communication with the peripheral device. The host computer has a data store, a display and a processor, and selectively transmits a request to the peripheral device requesting public settings of the peripheral device for generation of a virtual operator panel for the peripheral device on the display of the host computer. The peripheral device then receives the request for peripheral device settings from the host computer and transmits a response, preferably including one or more public settings from the data store of the peripheral device. And the host computer receives the response, including one or more public settings, from the peripheral device and generates a virtual operator panel based upon the response.

The peripheral device processor alternately transmits a response including a plurality of public settings, and the host computer processor may select a panel description based upon the panels indicated by the public settings included in the received response. The peripheral device processor then retrieves the public settings from the peripheral device data store and includes the retrieved public settings in the response.

The virtual operator panel on the display of the host computer preferably includes graphical representations of interactive controls for the peripheral device, and allows a user to actuate a graphical interactive control on the virtual operator panel to change public settings and the corresponding private settings on the peripheral device. In such embodiment, each public setting preferably represents a known setting on the virtual operator panel and thus, the operator panel can represent a specific control for the setting without knowledge of the specific private settings of the peripheral device. When the interactive control is actuated, the host computer then transmits a command to the peripheral device including one or more public settings implicated by the specific actuated interactive control to the peripheral device. The peripheral device processor then receives the command from the virtual operator panel of the host computer and actuates peripheral device functionality in accordance with the command. The peripheral device processor also preferably further transmits updated setting information including one or more public settings back to the host computer once the desired functions are altered on the peripheral device for updating of the virtual operator panel.

When the peripheral device is embodied as a printer, the host computer and printer preferably communicate using NPAP Protocol. Alternately, the host computer and peripheral device communicate using XML encoding. Other protocols and languages as known in the art are alternately used for communication between the host computer and peripheral device.

In a further embodiment, the peripheral device selectively transmits an alert signal including one or more public settings to one or more connected host computers in response to a triggering event in the peripheral device. The alert signal causes generation of the virtual operator panel on the display of the host computer to alert the user preferably with a warning including the public settings of the peripheral device.

The host computer is alternately a second peripheral device in communication with the peripheral device generating a virtual operator panel. Alternately, the peripheral device is a second host computer in communication with a host computer generation a virtual operator panel.

In another embodiment, the invention is a peripheral device generating a virtual operator panel where the peripheral device has a processor for running at least one host process and a device process, and has a data store that stores public settings in relation to the one or more private settings of the peripheral device that each public settings implicates. The host process selectively generates a request for peripheral device public settings for generation of a virtual operator panel for the peripheral device to the device process, and the device process retrieves one or more public setting indicative of the private settings of the peripheral device and transmits one or more public settings to the host process.

Each public setting preferably represents a predefined setting on the virtual operator panel. The host process preferably generates a virtual operator panel in response to receipt of one or more public settings from the device process, with each public setting represented as a predefined setting on the panel. Further, the host process can update an existing setting virtual operator panel in response to receipt of the public setting from the peripheral device.

Thus, when the virtual operator panel generated by the host process includes graphical representations of interactive controls for the peripheral device on the virtual operator panel, the actuation of a specific graphical interactive control causes the host process to transmit a command to the device process including one or more public settings implicated by the specific actuated interactive control. The device process then receives the command from the virtual operator panel of the host process and actuates peripheral device functionality in accordance with the command. Alternately, the device process can then transmit updated setting information including one or more public settings to the host process for updating of the virtual operator panel after actuating peripheral device functionality.

In like manner to the host computer-peripheral device communication, the host process and the device process preferably communicate through NPAP Protocol. Alternately, the host process and the device process communicate through XML encoding, or any other protocol or language as known in the art.

The present inventive system thus provides an inventive method for generating a virtual device operator panel for a peripheral device, including the steps of transmitting a request for peripheral device settings from a host computer to a peripheral device; receiving the request for peripheral device settings at the peripheral device. Then the method includes the steps of generating a response in the peripheral device where the response includes one or more public settings indicative of one or more private settings of the peripheral device, and then transmitting the response from the peripheral device to the host computer, receiving the response from the peripheral device at the host computer, and generating a functional virtual operator panel on a display at the host computer based upon one ore more public settings included in the received response.

The method alternately further includes the step of selecting a panel description from a plurality of panel descriptions in the data store of the peripheral device, where each panel description includes one or more public settings of the peripheral device, prior to the step of transmitting the response from the peripheral device. Then the step of generating the virtual operator panel is generating the virtual operator panel with the panel description from the peripheral device.

The method alternately further includes the steps of retrieving a panel description from the peripheral device data store, and including the retrieved panel description in the response transmitted to the host computer. Then the step of generating a response in the peripheral device, where the response includes one or more public settings indicative of one or more private setting of the peripheral device is generating a response in the peripheral device where the response includes one or more public settings representing a predefined setting on the virtual operator panel.

If the virtual operator panel is embodied on the display of the host computer as including graphical representations of interactive controls for the peripheral device, then the method further includes the steps of transmitting a command from the host computer to the peripheral device. The command preferably includes one or more public settings implicated by the specific actuated interactive control such that the step of transmitting the command occurs upon a user actuating a graphical interactive control on the virtual operator panel. Then the method further preferably includes the steps of receiving the command from the virtual operator panel of the host computer at the peripheral device processor, and actuating peripheral device functionality in accordance with the command received. And then the method further preferably includes the steps of transmitting from the peripheral device processor updated setting information including one or more public settings to the host computer, and updating the virtual operator panel with the public setting information.

If the peripheral device is a printer, then the steps of transmitting a request for peripheral device settings from a host computer to a peripheral device, and transmitting the response from the peripheral device to the host computer preferably occur through an NPAP Protocol. Alternately, the steps of transmitting a request for peripheral device settings from a host computer to a peripheral device, and transmitting the response from the peripheral device to the host computer occur through XML encoding.

When the present inventive system is embodied as a host process and device process in bidirectional communication on a peripheral device, the preferred method for generating a virtual device operator panel for a peripheral device includes the steps of transmitting a request for peripheral device settings from the host process to the device process, and receiving the request for peripheral device settings at the device process. The method then includes the step of generating a response from the device process, where the device process is in communication with a data store of the peripheral device and the data store including public settings in relation to the one or more private settings of the peripheral device that each public setting implicates, and the response including one or more public settings indicative of one or more parameters of the peripheral device. Then the method includes the steps of transmitting the response from the device process to the host process, receiving the response from the device process at the host process, and generating a functional virtual operator panel from the host process based upon the one ore more public settings included in the received response.

The method alternately further includes the step of selecting a panel description from a plurality of panel descriptions in the data store of the peripheral device, where each panel description including one or more public settings, such selection prior to the step of transmitting the response from the device process. Then the step of generating the virtual operator panel is generating the virtual operator panel with the panel description from the device process. Then the method preferably include the steps of retrieving a panel description from the peripheral device data store, such retrieval being accomplished by the device process, and including the retrieved panel description in the response transmitted to the host process.

The step of generating a response from the device process, where the response includes one or more public settings indicative of one or more private settings of the peripheral device is preferably generating a response from the device process where the response includes one or more public settings representing a predefined setting on the virtual operator panel.

If the generated virtual operator panel includes graphical representations of interactive controls for the peripheral device, the method further includes the steps of transmitting a command from the host process to the device process, where the command includes one or more public settings implicated by the specific actuated interactive control, receiving the command from the virtual operator panel of the host process at the device process, and actuating peripheral device functionality in accordance with the command received, such actuation occurring through the device process. The method then preferably further includes the steps of transmitting from the device process updated setting information including one or more public settings to the host process, and updating at the host process the virtual operator panel with the setting information for the updated settings of the peripheral device.

If the peripheral device upon which the host process and device process are occurring is a printer, then the steps of transmitting a request for peripheral device settings from a host process to a device process, and transmitting the response from the device process to the host process preferably occur through NPAP Protocol. Alternately, the steps of transmitting a request for peripheral device settings from a host process to a device process, and transmitting the response from the device process to the host process occurs through XML encoding, or any other language or protocol as known in the art.

The present invention thus provides a commercial advantage in that it allows a host computer in communication with a peripheral device to correctly display and modify the settings in that device on a virtual operator panel. The host computer does not need to have prior knowledge of the peripheral device or its settings. The use of the metavariable also provides a mechanism for the peripheral device to return translated values for those settings and groupings for the settings for updating the virtual operator panel.

The present invention further has industrial applicability as it can particularly enhance a known NPAP protocol, although other languages and protocols would also work, to provide metavariables that can return the valid values for each peripheral device setting, return the name of each setting, provide textual information (translated) for those settings as needed, and return all public settings of the peripheral device. The metavariable further can indicate which settings are read-only, indicate which settings should only be set by qualified personnel, and provide the host computer with the default values for a device setting. Additionally, the accuracy of the metavariable gives the virtual operator panel the ability to command specific changes in the peripheral device and prevents the transmission of invalid values which could crash the device.

Other objects, features, and advantages of the present invention will become apparent after review of the hereinafter set forth Brief Description of the Drawings, Detailed Description of the Invention, and claims.

BRIEF DESCRIPTION OF THE DRAWINGS

FIG. 4 is a block diagram of the operation of the host computer in FIG. 1.

FIG. 5 is a diagram illustrating host graphic objects sharing a common set of features for inclusion into list of peripheral device graphic objects such that the device objects can be treated by the display code homogeneously.

FIG. 6 is a flowchart illustrating the operation of the host computer in FIG. 1 upon a displayed button field on the virtual operator panel being actuated.

FIG. 11 is an exemplary list of variable values used to implement metavariables for describing "PRINT QUALITY" in for the printer.

DETAILED DESCRIPTION OF THE INVENTION

Figure 1:
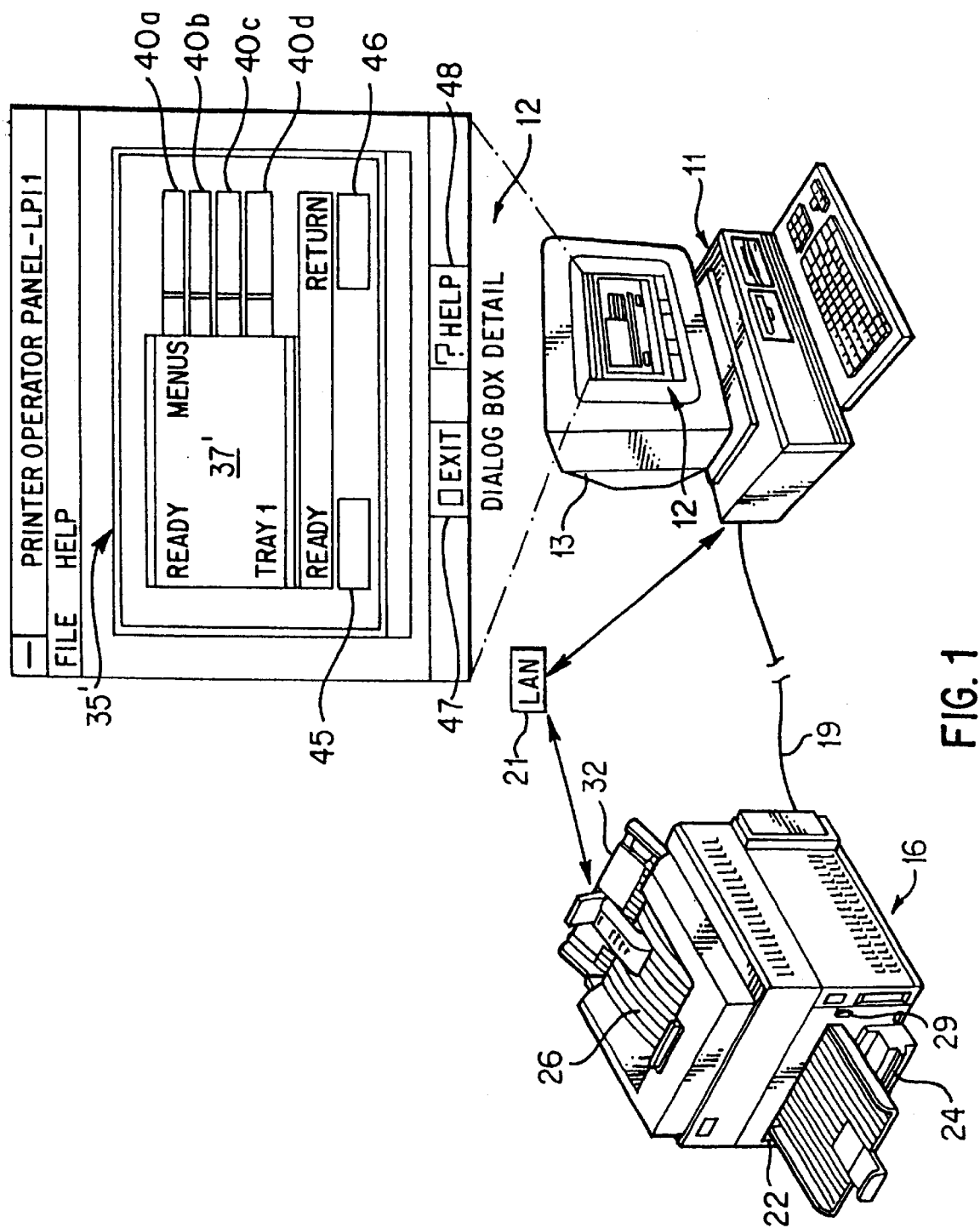
FIG. 1 is an illustration of a host computer and a peripheral device in bidirectional communication.

Referring now to the drawings in which like numerals represent like components throughout the several views, FIG. 1 illustrates a typical host computer 11 connected to a keyboard and a video display 13. Host computer 11 is also preferably connected to a mouse and/or other suitable pointing device(s) such as a touch screen, trackball, joystick or other device capable of "clicking on" or otherwise indicating and selecting features appearing on display 13. Host computer 11 is preferably a personal computer, but is alternately any computerized device that has the components and capability as set forth for the host computer 11 and peripheral device herein. Host computer 11 will also typically include an internal hard drive or other suitable program memory, 3.5 inch and/or 5.25 inch removable disk drives 15a and 15b, respectively, for uploading and downloading programs and data. Host 11 also includes a sufficient amount of internal random access memory (RAM) to support its operating system as well as all applications and utility software desired to be run on host 11. The collective memory components of the host computer 11 thus comprises a data store for the host computer 11.

Host computer 11 is also connected to one or more peripheral devices, such as printer 16, which can either be connected to host computer 11 locally, such as by a cable 19 coupled to a parallel port of host computer 11, or through a local area network (LAN) 21 or the Internet through an appropriate commercially available network card (not shown) installed in an available expansion slot of host computer 11. A printer 16 installed on a network 21 is connected to the network by way of an internal network adapter card (INA), or through other methods and devices as are known in the art. Printer 16 can be physically located at a site in proximity to or remotely from host computer 11 and is not required to be in convenient operating and viewing proximity to a user of host computer 11.

Printer 16 will typically include a power on/off switch 22, a paper tray 24 for holding a supply of blank pages of a predetermined size, as well as an output bin 26 and/or a front exit tray 28 for receiving finished printed pages. Where more than one such paper exit path is available as shown, an exit path selection switch 29 can be provided for selecting delivery of printed pages either to bin or tray, and the selection of the exit path can likewise be a setting for the printer 16. For convenience of loading blank pages of a special nature such as envelopes, transparencies or unusual sizes of paper, a manual feed tray 32 may also be provided, and paper lying in manual feed tray 32 can likewise effect a setting of the printer 16, indicating the source of paper. In the preferred embodiment, the peripheral device is a printer 16, but the invention is equally applicable to other peripheral devices to include modems, faxes, and scanners. Furthermore, the peripheral device in the present invention can also be a second host computer similar to host computer 11, and the second host computer transmits its settings in the manner specified herein to support virtual operator panel generation on the host computer 11 of the settings for the second host computer.

While most printers typically include an operator panel having one or more indicator lights and/or an alphanumeric display for providing information to a human operator, printer 16 is illustrated without an operator panel which allows the printer to be more economical. For purposes of the present invention, it is irrelevant if the peripheral device, such as printer 16, includes a settings display as the virtual operator panel 12 will display the requisite information for operation of the peripheral device. Such information can include status messages, attendance messages, service messages, instructions and/or prompts.

In compliment to the functions of the printer, host computer provides a virtual operator panel 12 on the display 13. As an example, virtual operator panel 12 includes a graphic interactive display 35, shown here as having four virtual variable function pushbuttons 40a, 40b, 40c and 40d, each of which represent a specific public setting and/or function of the printer 16. Examples of the settings are page size, paper tray, print quality, paper orientation, reduction or enlargement, and paper collation. A user of the host computer 11 has the ability to change the information displayed thereon based upon the present state of printer 16 and actuation of the pushbuttons 40a, 40b, 40c, and 40d.

Figure 2:
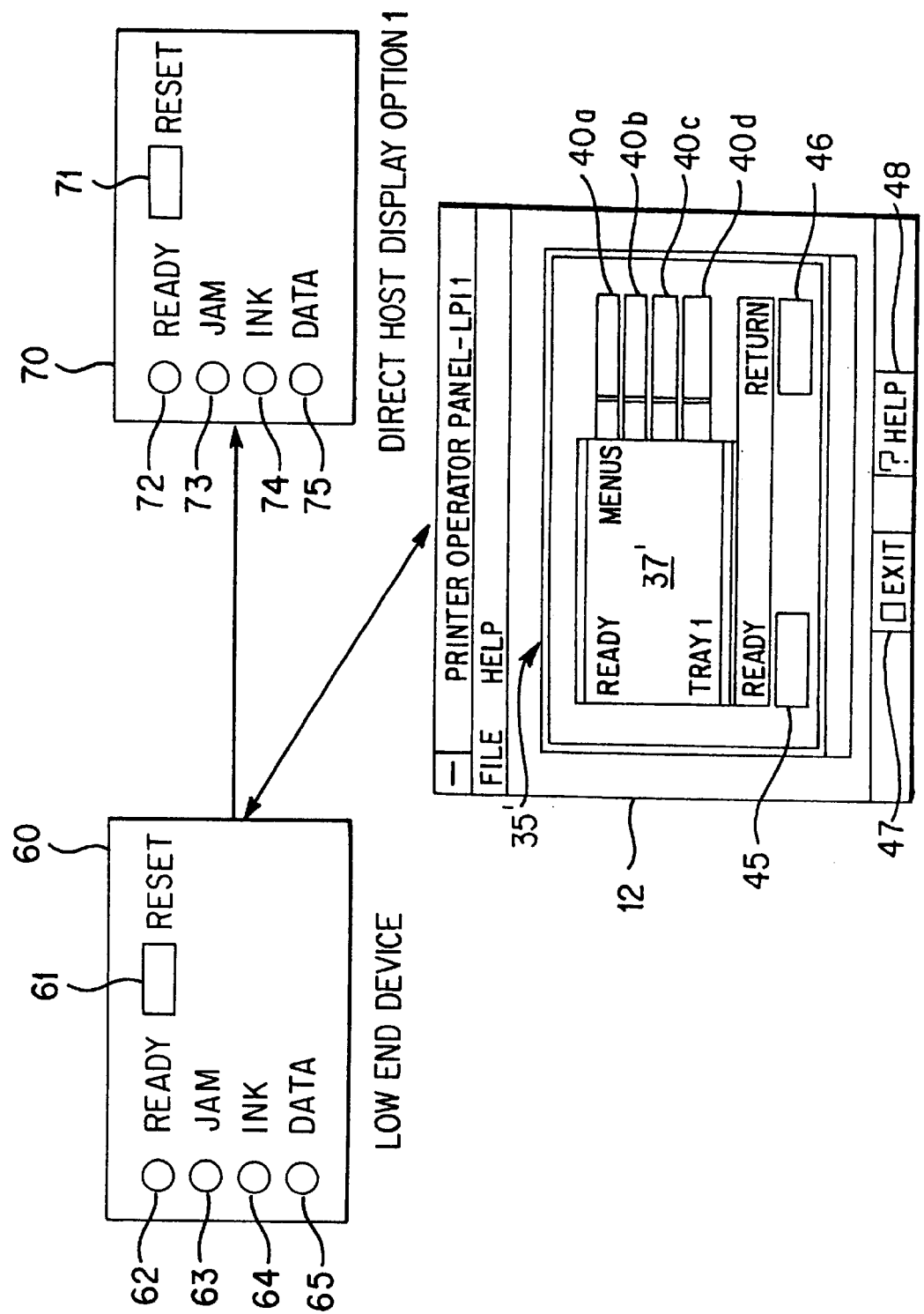
FIG. 2 is a graphic view of the device panel and two possible host representations.
Figure 3:
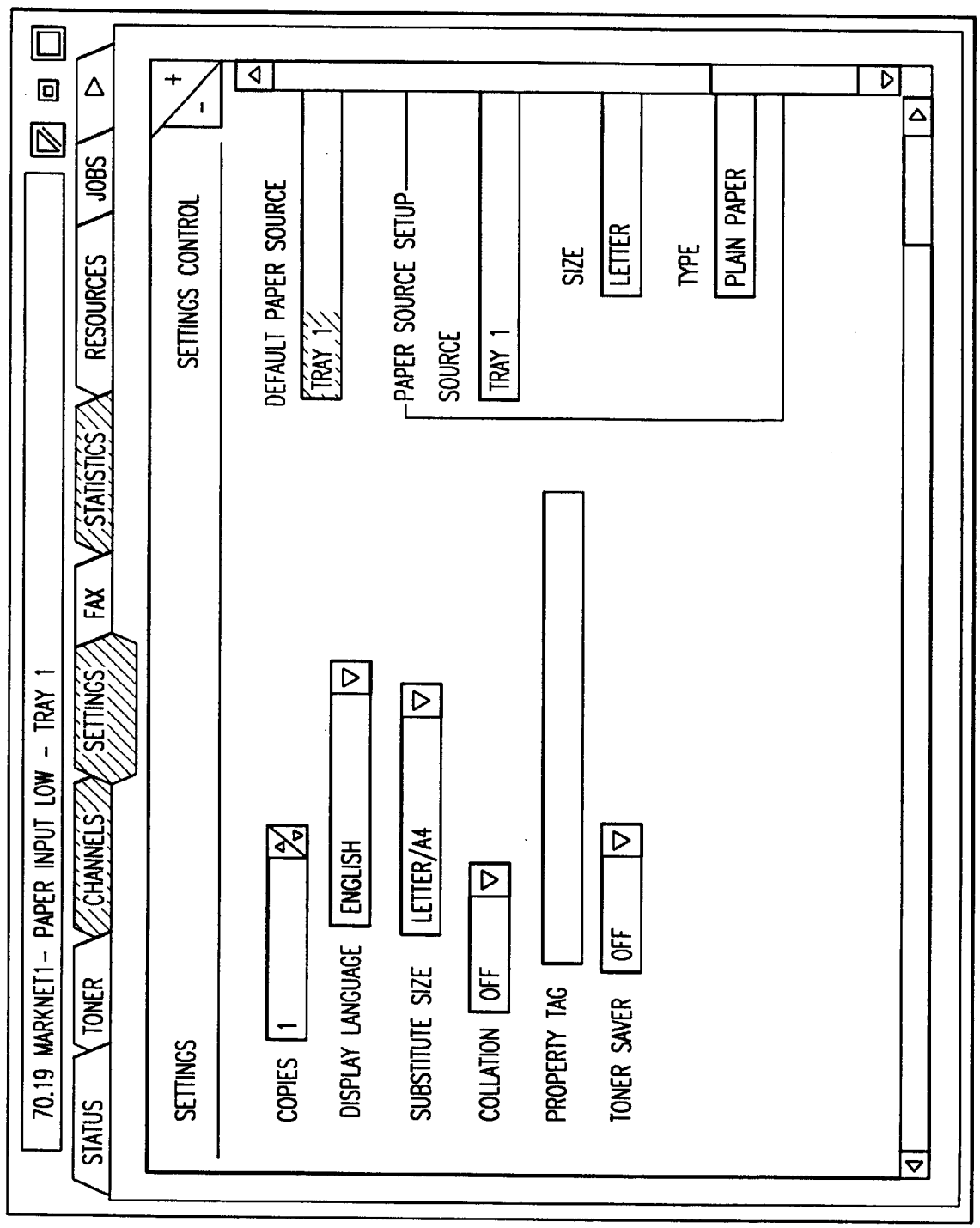
FIG. 3 is an exemplary graphic representation of an alerting virtual operator panel warning the user that the paper is low in the paper tray.

There are many methods available to select the specific virtual operator panel 12 provided by the host computer 11. One method is to simply select a generic virtual operator panel, such as virtual operator panel 12, that has conceptual pushbuttons for the individual settings of any printer, and the public settings or metavariables as disclosed herein provide functionality to the generic pushbuttons as they enable communication with the peripheral device without advance knowledge of the specific settings and capabilities of the peripheral device. The actual panel description for display as the virtual operator panel 12 can also be determined by an initial query to the peripheral device and chosen based upon the public settings, metavariables, or other information received by the host computer 11. Alternately, the peripheral device can generate a specific command to have the host computer display a certain virtual operator panel, which is particularly useful in the generation of an alert panel (FIG. 3) as further discussed herein. The specific panels shown in FIGS. 1, 2, and 3 are merely illustrative of a virtual operator panel and many variations can be made, often at the time of communication or interface, that result in the selection of a specific panel for display. Nonetheless, the generic operator panel, such as virtual operator panel 12, takes full advantage of the novel aspects and functionality of the host computer's use of public settings and metavariables to communicate with peripheral device.

Pushbuttons 40a through 40d are thus each capable of performing a variety of different functions, currently available ones of which are indicated by a changeable legend which may appear on central display 37 just to the left of one or more pushbuttons 40a through 40d. Beneath the display, two dedicated functions are available through a "Ready" pushbutton 45 and a "Return" pushbutton 46 whose legends are permanently labeled in the virtual operator panel. The internal controller of printer 16 as relevant to the present invention will be described in detail further below.

The host computer 11 is provided with a software utility program which, in cooperation with the controller of printer 16, facilitates bidirectional communication between host computer 11 and printer 16 in order to provide a user of host computer 11 with the virtual operator panel 12. Such program can be supplied in a form stored on magnetic media such as a 3.5 inch floppy disk which can be downloaded to the internal hard drive of host computer 11. The present invention is used to the greatest advantage within operating environments using a graphical user interface, such as Microsoft Windows or IBM OS/2.RTM, that effectively permits executing multiple applications simultaneously.

The host computer 11 and printer 16 preferably communicate through National Printer Alliance Protocol. The NPA protocol (NPAP) is a protocol which not only defines specific NPAP commands but which also permits other forms of commands or data to be associated with an NPA "wrapper" in order to permit NPAP commands or command extensions to be interspersed within the normal data stream transmitted in the interface between the host computer 11 and printer 16. When active on one of the processors, the NPAP task is capable of recognizing and capturing NPAP commands or command extensions from the data stream for special processing while permitting other information to be processed.

A NPAP communication packet is therefore a structured field of digital information. A NPAP packet includes a start of packet byte, a two byte length field, a flag byte, and a command byte, followed by a sub-command and/or data fields and associated error checking. To facilitate description herein, the error checking bytes, which can be placed at the end of a packet in a conventional manner, will be omitted. The packet structure is then:

| START | LENGTH | FLAG | COMMAND | DATA |
|-------|--------|------|---------|------|
| A5    | XXXX   | XX   | XX      | XX   |

The entries for the fields are eight bit bytes shown in hexadecimal (hex) notation. So, for example, the "start of packet" byte for a NPAP packet is hexadecimal A5 (decimal 165). The packet length field is a two byte word indicating the number of bytes in the packet, not including the length field itself or the start of packet byte. The NPAP default value for maximum packet size is 64 bytes. Host 11-to-printer 16 packets are often shorter, usually six to eightbytes long. As an example, a packet length of six bytes would be indicated as 00 06. The NPAP Protocol identifies a command that permits host 11 to set the maximum packet length that host 11 will accept. Typically, if host computer 11 is communicating via a network such as LAN 21, the maximum receive packet size is set to the packet size of the communication protocol used by the network. If a response from printer 16 is longer than that packet size, the processor processing the NPAP task splits the response into two or more acceptably sized packets. Then the NPAP task indicates that the next packet is a continuation of the current one by setting bit 5 in the packets flag byte.

In the case of communication from the host computer 11 to the printer 16, the purpose of the flag byte is to provide a single byte that the printer 16 can examine to obtain control information. Each bit of the flag byte may be defined so that there is a meaning if the bit is set (logic one) or cleared (logic zero). For present purposes, the bits four and six are of interest (where bit zero is the least significant bit and bit seven is the most significant bit). Bit six, if set, indicates that the packet contains a message to be processed by the NPAP component of the printer controller. If bit six is cleared, the packet contains data for a printer interpreter. Bit four, i if set, calls for a response from the printer 16. If, for example, both bits four and six are set (and no other bits are set), the flag byte is hex 50.

In the case of communication from the printer 16 to the host computer 11, the purpose of the flag byte is to provide a single byte which the host 11 can examine to obtain control information for the message and a quick view of the status of printer 16. As in the case of communications from a host 11 to the printer 16, the flag byte contains individually defined bits.

Here, bit six, if set, indicates that the message is from the NPAP task of the printer controller on the printer 16. Bit four, if set, means that the communication is a response that was requested by the host computer 11 (solicited via flag bit four in the message from the host). Bits zero and one are set to the state the printer 16 is in at the time the response is sent from the printer 16 to provide information on current printer configuration. For example, the preferable meanings of the conditions of these bits (bit one-bit zero) are: 00—printer 16 is operable with no alert conditions, 01—printer is operable but there is a condition the operator desires to be aware of (such as a low toner warning), 10—a condition exists that will prevent further printing which can be remedied by the operator, and 11—a condition exists that will prevent further printing and which can be remedied only by a servicing from a technician.

The fifth byte of a host 11-to-printer 16 NPAP packet is a command byte, whose meaning is dependent upon the state of bit six in the flag byte. If flag bit six is set, the command byte contains a command for the NPAP task of the printer controller of the printer 16. If flag bit six is cleared, the command byte contains a logical unit designation for the printer controller.

In the case of a printer 16-to-host 11 reply message, the original command or logical unit identification of the host 11-to-printer 16 message that caused the reply is returned. If the message from the printer 16 is unsolicited (flag bit four cleared and flag bit six set) and the command byte is FX, then the packet represents an alert of type FX. As an example, a Device Status Alert (DSA) for the peripheral device is indicated by a command byte of FF.

For packets emanating from a host 11, the data bytes following the command byte have a meaning which is dependent upon flag bit six. If flag bit six is set, the data field contains either data or a command modifier, dependent on the command, for the NPAP task of printer controller. If flag bit six is cleared, the data field contains data for the input queue of a logical unit within the printer controller or the printer 16.

In the case of NPAP packets emanating from the printer 16, when flag bit six is set, the data field contains Alert data for an FX command byte, or the packet contains error information or the data field contains a command response as called for by the command returned in the command byte (flag bit four set). When flag bit six is cleared, the data field contains a message from a Logical Unit within the processor of the printer 16 and byte five identifies the Logical Unit from which the message originates.

The published NPA protocol defines a number of commands and subcommands. These include various types of "alerts" intended to be transmitted from a printer 16 to a host computer 11, which can be displayed on the virtual operator panel 12 or cause the virtual operator panel to appear on the display 13. These are useful for communicating standard error conditions or printer state changes, such as the low paper warning. The NPAP protocol also provides the ability for users to define unique alert conditions using command extensions.

An example of an alert display of the virtual operator panel appears in FIG. 3. The alert panel in FIG. 3 particularly illustrates a menued alert panel indicating that the paper supply in an input tray is low. The virtual tab for "settings" specifically illustrates the parameters of the paper trays on the printer, and thus, each setting can be changed in order to remedy low paper status and resume operation of the printer.

The following commands are illustrative of NPAP commands that can be used to implement the present inventive virtual operator panel 12 and provide these capabilities to the host computer 11. There are three defined types of variables: settings, ranges and strings.

Settings are a finite list of values that usually have a textual setting. Ranges usually go from x to y and may have a group of settings that are outside the range. Strings are one or more variables comprised of alphanumeric and other characters. For most of the commands, one can choose whether or not to have the peripheral device return the textual values to update the virtual operator panel. For purposes of the tables below, the 'current' value is the value used while processing a job, and 'default' is the value that resides in the device and is used when each job starts, and 'factory' is the value that is placed in the device as the default if requested to reset the printer to its respective settings as manufactured.

The following general definitions apply to the various commands illustrated in the charts of the disclosure:

NVRAM Variable Information—this command provides the host with a mechanism to retrieve some or all of the settings in the device. Private settings are not returned on a request for all settings. An example of a private setting is a password. While some variables, such as a serial number,are read-only, and other variables such as fuser temperature, are only adjustable by a customer engineer.

NVRAM Variable Read—this command provides the host with a mechanism to retrieve the default value or the factory value of the setting without fully describing the setting. This command is useful if host computer 11 only wanted to display the settings to the user without allowing the user to update the settings.

NVRAM Variable Write—this command provides the host with a mechanism to update the default value stored in the peripheral device.

NVRAM Variable Information by Group—this command functions like Variable Information, but returns all the variables in a given group.

NVRAM Variable Read By Group—similar to Variable Read, but returns the values for all the variables in a group.

NVRAM Variable Write (No Validation)—this command is used by Manufacturing or Field Support. This is a fairly dangerous command for end-user usage as it bypasses the validation routines provided in Variable Write that prevent the crashes as described in the description of the related art above. Examples are:

NVRAM Variable Write (Current NV Only)
NVRAM Variable Write (No Validation using NV values)
NVRAM Variable Write (BITWISE OR)
NVRAM Variable Write (BITWISE AND)

Figure 9:
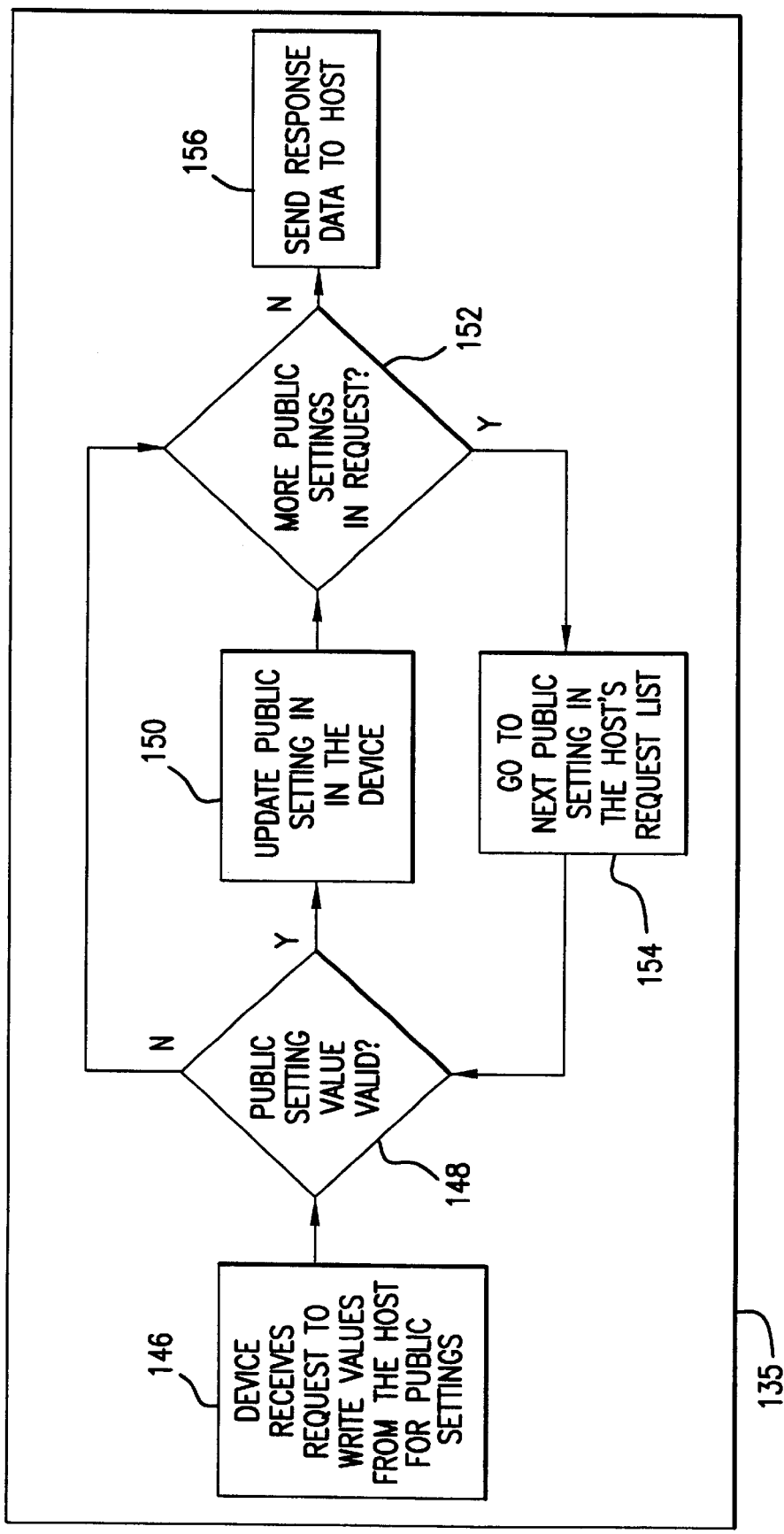
FIG. 9 is a flowchart illustrating the operation of the peripheral device in FIG. 1 upon receipt of a request from the host computer to update specific variables in the peripheral device (with validation).

Accordingly, the following commands are preferably loaded onto the NVRAM of the printer 16 (as shown in FIG. 9 and discussed below) to provide the NPAP packets to the host computer 11.

AM Variable Information

Host Command

| Byte | Command:<br>Subcommand:<br>Value - Hex | Extension Command<br>NVRAM Variable Management<br>Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Extension Command | |
| 1 | B2 | Subcommand: NVRAM Management | Data Field |
| 1 | 01 | Function: NVRAM Variable Information | |
| 1 | Unsigned Byte | Flags:<br>0x00 - No Textual information returned<br>0x01 - Return Textual information | |
| 1 | Unsigned Byte | NPA Language ID | |
| 1 | Unsigned Byte | All Possible Values | |
| 2 | Unsigned Word | Number of NPA ids<br>0x00 00 - Get information for "all" variables | |
| 2 | Unsigned Word | NPA ID #1 | ID #1 |
| . | . | . | |
| . | . | . | |
| . | . | . | |
| 2 | Unsigned Word | NPA ID #N | ID #N |

Flags: When the Flag byte in the Request Variable Information command is set to 0x00, then no textual information for non-string data types will be returned. When set to 0x01, the textual values associated with Settings will be returned, if available.
NPAP Language ID: This ID is defined by NPA and informs the Printer what language in which to return the textual strings. These values are defined in the Request Device Characteristics chapter.
All Possible Values: When this value is set to 0x00, only those values that are currently valid will be returned. When set to 0x01, all possible valid values are returned.
Number of IDs: This tells NPAP the number of IDs being requested. If this is set to 0x00, then NPAP determines that public IDs are to be returned.
NPAP IDs: This tells NPAP which NVRAM variables to query and process their information.

The following table illustrates a NPAP response from the printer 16 to the host computer

Printer Response

| Byte | Command:<br>Subcommand:<br>Value - Hex | Extension Command<br>NVRAM Variable Management<br>Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Extension Command | |
| 1 | B2 | Subcommand: NVRAM Management | Data Field |
| 1 | 01 | Function: NVRAM Variable Information | |
| 1 | Unsigned Byte | Version of command response<br>0x00 - Response is still being defined and may change | |
| 1 | Unsigned Byte | NPA Language ID | |
| 1 | Unsigned Byte | All Possible Values | |
| 2 | Unsigned Word | SNMP Character Set Encoding | |
| 2 | Unsigned Word | NPA ID #1 | |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 2 | Unsigned Word | Length of Text Description for the variable | |
| N | ASCII | Text Description | |
| 4 | Signed Dbl Word | NV group ID | |
| 2 | Unsigned Word | Length of Text Description for the group id | |
| N | ASCII | Text Description | |
| 1 | Unsigned Byte | Data Type<br>0x00 - String<br>0x01 - Range<br>0x02 - Setting | |
| N | Binary data | Data Type Specific Data | |

-continued

Printer Response

Command: Extension Command
Subcommand: NVRAM Variable Management

| Byte | Value - Hex | Description | Notes |
|---|---|---|---|
| . | . | . | |
| . | . | . | |
| . | . | . | |
| 2 | Unsigned Word | NPA ID #N | ID #N |
| 1 | Bit Encoded Byte | Error Flag | |
| | | Bit 0 - Invalid NPA ID | |
| | | Bit 1 - NPA Data Error | |
| | | Bit 2 - Read Only Error | |
| | | Bit 3 - Remote Offline Required | |
| | | Bit 4 - String Too Long | |
| 2 | Unsigned Word | Length of Text Description for the variable | |
| N | ASCII | Text Description | |
| 4 | Signed Dbl Word | NV group ID | |
| 2 | Unsigned Word | Length of Text Description for the group id | |
| N | ASCII | Text Description | |
| 1 | Unsigned Byte | Data Type | |
| | | 0x00 - String | |
| | | 0x01 - Range | |
| | | 0x02 - Setting | |
| N | Binary data | Data Type Specific Data | |

SNMP Encoding ID: This ID tells the host computer what character encoding to use when displaying the text descriptions.
NV Group ID: This ID will group like variables together. If a textual description is available, it will be returned.
Data Type: Each data type, String, Range, Setting, and Combination has unique information to return. This value will tell the host how to interpret the information that follows.

30

The following NPAP packet is for the requesting of specific variables or data from the peripheral device:
Data Type Specific Data:

String:

| Byte | Value - Hex | Description | Notes |
|---|---|---|---|
| 2 | Bit Encoded Word | Variable Information | |
| | | Bit 0 - Remote Offline Required | |
| | | Bit 1 - POR will automatically occur after setting | |
| | | Bit 2 - Reserved | |
| | | Bit 3 - Should only be set by Service Representatives | |
| | | Bit 4 - Should only be read - Do NOT set | |
| | | Bit 5 - Info will not be returned unless specifically asked. | |
| | | Bit 6 - Boolean - Only two settings are valid (either On/Off or True/False) | |
| 2 | Unsigned Word | Maximum Length of String | |
| 2 | Unsigned Word | Current Length of String | |
| N | ASCII | Text of String | |

Range/Combo:

| Byte | Value - Hex | Description | Notes |
|---|---|---|---|
| 2 | Bit Encoded Word | Variable Information | |
| | | Bit 0 - Remote Offline Required | |
| | | Bit 1 - POR will automatically occur after setting | |
| | | Bit 2 - Reserved | |
| | | Bit 3 - Should only be set by Service Representatives | |
| | | Bit 4 - Should only be read - Do NOT set | |
| | | Bit 5 - Info will not be returned unless specifically asked. | |
| | | Bit 6 - Boolean - Only two settings are valid (either On/Off or True/False) | |
| 1 | Bit Encoded Byte | Flag Information | |
| | | Bit 0 - If set, the Range is a signed value, otherwise it is an unsigned. | |
| | | Bit 1 - if set, the default value is a Range, otherwise it is an index to the settings array | |
| | | Bit 2 - If set, the factory value is a Range, otherwise it is an index to the | |

-continued

Range/Combo:

| Byte | Value - Hex | Description | Notes |
|---|---|---|---|
| | | settings array | |
| | | Bit 3 - Reserved | |
| | | . | |
| | | . | |
| | | . | |
| | | Bit 7 - Reserved | |
| 2 | Unsigned Word | Size (in bytes) of the data element (1, 2, or 4) | |
| | | Note: Use this size to read the rest of the data | |
| (1, 2, 4) | Binary | Start of the Range | |
| (1, 2, 4) | Binary | End of the Range | |
| (1, 2, 4) | Binary | Increment for the Range | |
| (1, 2, 4) | Binary | Default value for the Range (Note: Use bit flag to interpret this value) | |
| (1, 2, 4) | Binary | Factory value for the Range (Note: Use bit flag to interpret this value) | |
| 2 | Unsigned Word | Number of exception settings for this range | |
| (1, 2, 4) | Binary | Exception Value | $1^{st}$ exception |
| 2 | Unsigned Word | Size of Text String | |
| N | ASCII | Text of String | |
| . | . | . | |
| . | . | . | |
| . | . | . | |
| (1, 2, 4) | Binary | Exception Value | Nth exception |
| 2 | Unsigned Word | Current Length of String | |
| N | ASCII | Text of String | |

A pure Range will have the number of exceptions set to zero.

Setting:

| Byte | Value - Hex | Description | Notes |
|---|---|---|---|
| 2 | Bit Encoded Word | Variable Information | |
| | | Bit 0 - Remote Offline Required | |
| | | Bit 1 - POR will automatically occur after setting | |
| | | Bit 2 - Reserved | |
| | | Bit 3 - Should only be set by Service Representatives | |
| | | Bit 4 - Should only be read - Do NOT set | |
| | | Bit 5 - Info will not be returned unless specifically asked. | |
| | | Bit 6 - Boolean - Only two settings are valid (either On/Off or True/False) | |
| 2 | Unsigned Word | Size (in bytes) of the data element (1, 2, or 4) | |
| | | Note: Use this size to read the setting's values | |
| 2 | Unsigned Word | Offset into settings array for the Default (NVRAM) value | |
| 2 | Unsigned Word | Offset into settings array for the Factory value | |
| 2 | Unsigned Word | Number of exception settings for this range | |
| (1, 2, 4) | Binary | Setting Value | $1^{st}$ exception |
| 2 | Unsigned Word | Size of Text String | |
| N | ASCII | Text of String | |
| . | . | . | |
| . | . | . | |
| . | . | . | |
| (1, 2, 4) | Binary | Setting Value | Nth exception |
| 2 | Unsigned Word | Current Length of String | |
| N | ASCII | Text of String | |

It is possible to have zero valid settings. This may occur if an option is not installed or some other setting may invalidate this variable. And if no text description is returned, even though it was requested, that setting is not displayed by the front panel nor the Web Page but may still be a valid setting.

NVRAM Variable Read

Host Command

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 02 | Function: NVRAM Variable Read | |
| 1 | Unsigned Byte | Flags:<br>0x00 - No Textual information returned<br>0x01 - Return Textual information | |
| 1 | Unsigned Byte | NPA Language ID | |
| 1 | Unsigned Byte | Setting<br>0x01 Default (NVRAM)<br>0x02 Factory | |
| 2 | Unsigned Word | Number of NPA ids<br>0x00 00 - Get information for "all" variables | |
| 2 | Unsigned Word | NPA ID #1 | ID #1 |
| . | . | . | |
| . | . | . | |
| . | . | . | |
| 2 | Unsigned Word | NPA ID #N | ID #N |

The following are examples of a printer 16 response for information from the host computer 11 to update the virtual operator panel 12.

Printer Response

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 02 | Function: NVRAM Variable Read | |
| 1 | Unsigned Byte | Version number for this response | |
| 1 | Unsigned Byte | NPA Language ID | |
| 2 | Unsigned Word | SNMP Character Encoding | |
| 2 | Unsigned Word | NPA ID #1 | ID #1 |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 4 | Signed Dbl Word | NV group ID | |
| 1 | Unsigned Byte | Data Type<br>0x00 - String<br>0x01 - Range<br>0x02 - Setting | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| N | Binary | Data Type Specific | |
| . | . | . | |
| . | . | . | |
| . | . | . | |
| 2 | Unsigned Word | NPA ID #N | ID #N |
| 1 | Bit Encoded Byte | Error Flag<br>Bit 0 - Invalid NPA ID<br>Bit 1 - NPA Data Error | |

-continued

Printer Response

Command: Lexmark Extension Command
Subcommand: NVRAM Variable Management

| Byte | Value - Hex | Description | Notes |
|---|---|---|---|
| 1 | Unsigned Byte | Bit 2 - Read Only Error<br>Bit 3 - Remote Offline Required<br>Bit 4 - String Too Long<br>Data Type<br>0x00 - String<br>0x01 - Range<br>0x02 - Setting | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| N | Binary | Data Type Specific | |

The printer 16 can return various NPAP packets for the various types of data resident on the printer 16.

Data Type Specific Data:

| Byte | Value - Hex | Description | Notes |
|---|---|---|---|
| String: | | | |
| 2 | Unsigned Word | Maximum Length of String | |
| 2 | Unsigned Word | Current Length of String | |
| N | ASCII | Text of String | |
| Range/Combo: | | | |
| 2 | Unsigned Word | Size (in bytes) of the data element (1, 2, or 4)<br>Note: Use this size to read the rest of the data | |
| (1, 2, 4) | Binary | Range value | |
| 2 | Unsigned Word | Size of Text String | |
| N | ASCII | Text of String | |
| Setting: | | | |
| 2 | Unsigned Word | Size (in bytes) of the data element (1, 2, or 4)<br>Note: Use this size to read the rest of the data | |
| (1, 2, 4) | Binary | Range value | |
| 2 | Unsigned Word | Size of Text String | |
| N | ASCII | Text of String | |

The size of the Text String will be zero if no text is requested or no text is available.

NVRAM Variable Write

Host Command

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 03 | Function: NVRAM Variable Write | |
| 2 | Unsigned Word | Number of NPA ids<br>0x00 00 - Get information for "all" variables | |
| 2 | Unsigned Word | NPA ID #1 | ID #1 |
| 2 | Unsigned Word | Size of Data to write | |
| n | Binary | Data | |

-continued

Host Command

Command: Lexmark Extension Command
Subcommand: NVRAM Variable Management

| Byte | Value - Hex | Description | Notes |
|---|---|---|---|
| . | . | . | |
| . | . | . | |
| . | . | . | |
| 2 | Unsigned Word | NPA ID #N | ID #N |
| 2 | Unsigned Word | Size of Data to write | |
| n | Binary | Data | |

An example of a printer 16 response to a command from the host computer 11 is:

Printer Response

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 03 | Function: NVRAM Variable Write | |
| 1 | Unsigned Byte | Version number for this response | |
| 2 | Unsigned Word | NPA ID #1 | ID #1 |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 2 | Unsigned Word | Size of data | |
| N | Binary | New Value | |
| . | . | . | |
| . | . | . | |
| . | . | . | |
| 2 | Unsigned Word | NPA ID #N | ID #N |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 2 | Unsigned Word | Size of data | |
| N | Binary | Data Type Specific | |

The following example retrieves groups of variable information from the printer 16.
NVRAM Variable Information by Group

Host Command

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |

-continued

Host Command

Command: Lexmark Extension Command
Subcommand: NVRAM Variable Management

| Byte | Value - Hex | Description | Notes |
|---|---|---|---|
| 1 | 04 | Function: NVRAM Variable Information | |
| 1 | Unsigned Byte | Flags: | |
| | | 0x00 - No Textual information returned | |
| | | 0x01 - Return Textual information | |
| 1 | Unsigned Byte | NPA Language ID | |
| 1 | Unsigned Byte | All Possible Values | |
| 2 | Unsigned Word | Number of NPA ids | |
| | | 0x00 00 - Get information for "all" variables | |
| 2 | Unsigned Word | NV Group ID #1 | ID #1 |
| . . | | . | |
| . . | | . | |
| . . | | . | |
| 2 | Unsigned Word | NV Group ID #N | ID #N |

Flags: When the Flag byte in the Request Variable Information command is set to 0x00, then no textual information for non-string data types will be returned. When set to 0x01, the textual values associated with Settings will be returned, if available.
NPA Language ID: This ID is defined by NPA and informs the Printer what language in which to return the textual strings. These values are defined in the Request Device Characteristics of NPAP protocol.
All Possible Values: When this value is set to 0x00, only those values that are currently valid will be returned. When set to 0x01, all possible valid values are returned.
Number of IDs: This relates in NPAP the number of IDs being requested. If this is set to 0x00, it means that public IDs are to be returned.
NPA IDs: This tells NPA which NVRAM variables to query and process their information.

Printer Response

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 04 | Function: NVRAM Variable Information | |
| 1 | Unsigned Byte | Version of command response | |
| | | 0x00 - Response is still being defined and may change | |
| 1 | Unsigned Byte | NPA Language ID | |
| 1 | Unsigned Byte | All Possible Values | |
| 2 | Unsigned Word | SNMP Character Set Encoding | |
| 2 | Unsigned Word | NPA ID #1 | |
| 1 | Bit Encoded Byte | Error Flag | |
| | | Bit 0 - Invalid NPA ID | |
| | | Bit 1 - NPA Data Error | |
| | | Bit 2 - Read Only Error | |
| | | Bit 3 - Remote Offline Required | |
| | | Bit 4 - String Too Long | |
| 2 | Unsigned Word | Length of Text Description for the variable | |
| N | ASCII | Text Description | |
| 4 | Signed Dbl Word | NV group ID | |
| 2 | Unsigned Word | Length of Text Description for the group id | |
| N | ASCII | Text Description | |
| 1 | Unsigned Byte | Data Type | |
| | | 0x00 - String | |
| | | 0x01 - Range | |
| | | 0x02 - Setting | |
| N | Binary data | Data Type Specific Data | |
| . . | | . | |
| . . | | . | |
| . . | | . | |
| 2 | Unsigned Word | NPA ID #N | ID #N |
| 1 | Bit Encoded Byte | Error Flag | |
| | | Bit 0 - Invalid NPA ID | |
| | | Bit 1 - NPA Data Error | |
| | | Bit 2 - Read Only Error | |
| | | Bit 3 - Remote Offline Required | |
| | | Bit 4 - String Too Long | |
| 2 | Unsigned Word | Length of Text Description for the variable | |

-continued

Printer Response

Command: Lexmark Extension Command
Subcommand: NVRAM Variable Management

| Byte | Value - Hex | Description | Notes |
|---|---|---|---|
| N | ASCII | Text Description | |
| 4 | Signed Dbl Word | NV group ID | |
| 2 | Unsigned Word | Length of Text Description for the group id | |
| N | ASCII | Text Description | |
| 1 | Unsigned Byte | Data Type<br>0x00 - String<br>0x01 - Range<br>0x02 - Setting | |
| N | Binary data | Data Type Specific Data | |

SNMP Encoding ID: This ID tells the host what character encoding to use when displaying the text descriptions.
NV Group ID: This ID is for grouping like variables together. A textual description will be returned if available.
Data Type: Each data type, String, Range, Setting and Combination, has unique information to return. This value will tell the host how to interpret the information that follows.

Data Type Specific Data:

| Byte | Value - Hex | Description | Notes |
|---|---|---|---|
| String: | | | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| 2 | Unsigned Word | Maximum Length of String | |
| 2 | Unsigned Word | Current Length of String | |
| N | ASCII | Text of String | |
| Range/Combo: | | | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| 1 | Bit Encoded Byte | Flag Information<br>Bit 0 - If set, the Range is a signed value, otherwise it is an unsigned.<br>Bit 1 - If set, the default value is a Range, otherwise it is an index to the settings array<br>Bit 2 - If set, the factory value is a Range, otherwise it is an index to the settings array<br>Bit 3 - Reserved<br>.<br>.<br>.<br>Bit 7 - Reserved | |
| 2 | Unsigned Word | Size (in bytes) of the data element (1, 2, or 4)<br>Note: Use this size to read the rest of the data | |
| (1, 2, 4) | Binary | Start of the Range | |
| (1, 2, 4) | Binary | End of the Range | |
| (1, 2, 4) | Binary | Increment for the Range | |
| (1, 2, 4) | Binary | Default value for the Range (Note: Use bit flag to interpret this value) | |
| (1, 2, 4) | Binary | Factory value for the Range (Note: Use bit flag to interpret this value) | |
| 2 | Unsigned Word | Number of exception settings for this range | |
| (1, 2, 4) | Binary | Exception Value | 1st exception |
| 2 | Unsigned Word | Size of Text String | |
| N | ASCII | Text of String | |
| . | . | . | |
| . | . | . | |
| . | . | . | |

-continued

| Byte | Value - Hex | Description | Notes |
|---|---|---|---|
| (1, 2, 4) | Binary | Exception Value | Nth exception |
| 2 | Unsigned Word | Current Length of String | |
| N | ASCII | Text of String | |

A pure Range will have the number of exceptions set to zero.

Setting:

| Byte | Value - Hex | Description | Notes |
|---|---|---|---|
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| 2 | Unsigned Word | Size (in bytes) of the data element (1, 2, or 4)<br>Note: Use this size to read the settings values | |
| 2 | Unsigned Word | Offset into settings array for the Default (NVRAM) value | |
| 2 | Unsigned Word | Offset into settings array for the Factory value | |
| 2 | Unsigned Word | Number of exception settings for this range | |
| (1, 2, 4) | Binary | Setting Value | $1^{st}$ exception |
| 2 | Unsigned Word | Size of Text String | |
| N | ASCII | Text of String | |
| . | . | . | |
| . | . | . | |
| . | . | . | |
| (1, 2, 4) | Binary | Setting Value | Nth exception |
| 2 | Unsigned Word | Current Length of String | |
| N | ASCII | Text of String | |

It is possible to have zero valid settings. This may occur if an option is not installed or some other setting may invalidate this variable.

The following is an example of reading a group of NVRAM variables in the printer 16.

NVRAM Variable Read by Group

Host Command

| | | | |
|---|---|---|---|
| | Command: | Lexmark Extension Command | |
| | Subcommand: | NVRAM Variable Management | |
| Byte | Value - Hex | Description | Notes |
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 05 | Function: NVRAM Variable Read | |
| 1 | Unsigned Byte | Flags:<br>0x00 - No Textual information returned<br>0x01 - Return Textual information | |
| 1 | Unsigned Byte | NPA Language ID | |
| 1 | Unsigned Byte | Setting<br>0x01 Default (NVRAM)<br>0x02 Factory | |
| 2 | Unsigned Word | Number of NPA ids<br>0x00 00 - Get information for "all" variables in all groups | |
| 2 | Unsigned Word | NV GROUP ID #1 | ID #1 |
| . | . | . | |
| . | . | . | |
| . | . | . | |
| 2 | Unsigned Word | NV GROUP ID #N | ID #N |

Printer Response

Command: Lexmark Extension Command
Subcommand: NVRAM Variable Management

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension Command | |
| 1 | B2 | Subcommand: NVRAM Management | Data Field |
| 1 | 05 | Function: NVRAM Variable Read | |
| 1 | Unsigned Byte | Version number for this response | |
| 1 | Unsigned Byte | NPA Language ID | |
| 2 | Unsigned Word | SNMP Character Encoding | |
| 2 | Unsigned Word | NPA ID #1 | ID #1 |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 4 | Signed Dbl Word | NV group ID | |
| 1 | Unsigned Byte | Data Type<br>0x00 - String<br>0x01 - Range<br>0x02 - Setting | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| N | Binary | Data Type Specific | |
| . | . | . | |
| . | . | . | |
| . | . | . | |
| 2 | Unsigned Word | NPA ID #N | ID #N |
| 1 | Bit Encoded Byte | Error Flag<br>Bit 0 - Invalid NPA ID<br>Bit 1 - NPA Data Error<br>Bit 2 - Read Only Error<br>Bit 3 - Remote Offline Required<br>Bit 4 - String Too Long | |
| 1 | Unsigned Byte | Data Type<br>0x00 - String<br>0x01 - Range<br>0x02 - Setting | |
| 2 | Bit Encoded Word | Variable Information<br>Bit 0 - Remote Offline Required<br>Bit 1 - POR will automatically occur after setting<br>Bit 2 - Reserved<br>Bit 3 - Should only be set by Service Representatives<br>Bit 4 - Should only be read - Do NOT set<br>Bit 5 - Info will not be returned unless specifically asked.<br>Bit 6 - Boolean - Only two settings are valid (either On/Off or True/False) | |
| N | Binary | Data Type Specific | |

Data Type Specific Data:

| Byte | Value - Hex | Description | Notes |
|---|---|---|---|
| String: | | | |
| 2 | Unsigned Word | Maximum Length of String | |
| 2 | Unsigned Word | Current Length of String | |
| N | ASCII | Text of String | |
| Range/Combo: | | | |
| 2 | Unsigned Word | Size (in bytes) of the data element (1, 2, or 4)<br>Note: Use this size to read the rest of the data | |

-continued

| Byte | Value - Hex | Description | Notes |
|---|---|---|---|
| (1, 2, 4) | Binary | Range value | |
| 2 | Unsigned Word | Size of Text String | |
| N | ASCII | Text of String | |
| Setting: | | | |
| 2 | Unsigned Word | Size (in bytes) of the data element (1, 2, or 4) Note: Use this size to read the rest of the data | |
| (1, 2, 4) | Binary | Range value | |
| 2 | Unsigned Word | Size of Text String | |
| N | ASCII | Text of String | |

The Size of Text String will be zero if no text is requested or no text is available.

While the data structures above are disclosed as NPAP data packets, one of skill in the art can implement the above command structures in other languages, such as extensible mark-up language (XML). Furthermore, the objects and functions of the various NPAP data packets can be utilized for an object-oriented programming language to implement the present inventive system and method.

FIG. 2 illustrates a graphic view of the virtual operator panel 13 of the host computer 11 of FIG. 1., with peripheral device display 60 and alternate simple virtual operator panel 70. Thus, the simple panel of the peripheral device display includes indicator lights that the device is ready (light 62), that there is a paper jam (light 63), that ink is low (light 64), or that data is in transmission or is being queued (light 65). The peripheral device display 60 also has reset button 61 for resetting the peripheral device.

The peripheral device display 60 can thus provide, in one embodiment, the virtual operator panel 12 for FIG. 1. Thus, virtual push buttons 40a–40d can thus represent the indicated parameters of indicator lights 62–65 of the peripheral device display 60. A positive indication on any of indicator lights 62–65 will thus be mirrored on the virtual operator panel 12 through metavariable generation and transmission occurring at the peripheral device.

Alternately, the peripheral device display 60 can generate a simple virtual replica panel 70, which is identical to the peripheral device display 60. The virtual replica panel 70 has at least replica virtual indicator lights that the device is ready (light 72),that there is a paper jam (light 73), that ink is low (light 74), or that data is in transmission or is being queued (light 75). The simple virtual panel 70 can also have the virtual indicator lights 72–75 as actuated buttons that can be actuated by the user on the virtual replica panel 70 to affect the settings governing each of the indicator lights' respective parameters.

FIG. 4 is a block diagram of the operation of the host computer 11 of FIG. 1, with the NPAP processor, block 92, transmitting data for display to the GUI (graphic-user interface) processor, block 94. The host computer 11 then retrieves an object list, block 96, and then displays the object, block 100, on the virtual operator panel 12, which is preferably integral with the GUI interface of the host computer 11.

With reference to FIG. 6, a diagram is shown particularly illustrating host graphic objects sharing a common set of features for inclusion into list of peripheral device graphic objects such that the device objects can be treated by the display code homogeneously. The individual graphic object, shown at block 104, is comprised of a string object, block 106, a range object, block 108, and a setting object, block 110. The particular attributes of the string, range and settings objects are discussed above in the various tables implementing them in NPA Protocol.

FIG. 5 is a flowchart illustrating the operation of the host computer 11 in FIG. 1, upon a displayed button field on the virtual operator panel being actuated, such as pushbuttons 40a–40d, to send a request for public setting data from the peripheral device 16. The GUI processor requests data from the peripheral device, shown at step 114, and the NPAP processor builds a NPAP data packet for transmission to the peripheral device, shown at step 116. Then the peripheral device 16 receives the host computer 11 request and validates the request, shown at step 118.

Figure 7:
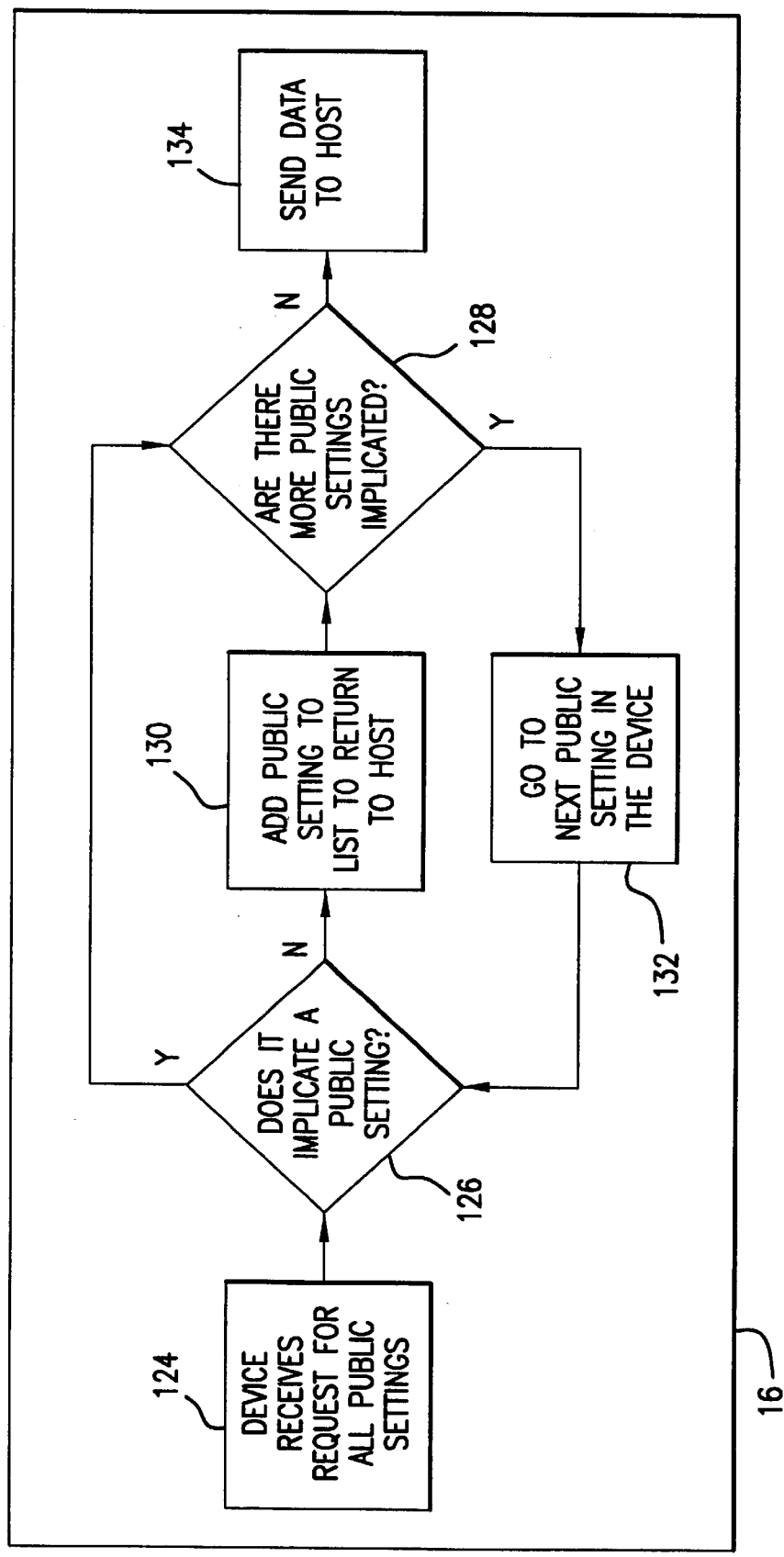
FIG. 7 is a flowchart illustrating the operation of the peripheral device in FIG. 1 upon receipt of a request from the host computer for all public settings or variables for the peripheral device.

In FIG. 7, there is shown a flowchart illustrating the operation of the peripheral device (printer 16) in FIG. 1, upon receipt of a request from the host computer for all public settings for the peripheral device for each public setting requested. The peripheral device received the request, shown at step 124, and then makes a decision as to whether the request implicates one or more private settings, shown at decision 126. If there are private settings, then determination of the specific private settings of the peripheral device will have to be made, and a decision is made as to whether there are any more private settings implicated, shown by decision 128. If the public setting request did not implicate a private setting, then the public setting of the peripheral device is added to the list to return to the host shown at step 130, and then the decision as to whether any more private settings are implicating, decision 128. If it is determined that further public settings are present in the request, then the next public setting in the request is obtained, shown by step 132, and the decision is again made as to whether the public setting implicates private variable, decision 126. If no more private settings are present at decision 128, then the data is returned to the host computer, shown at step 134, for display on the virtual operator panel.

It should be noted that it is not necessary for the individual public setting to implicate more than one private setting of the peripheral device, as the public setting serves as a conceptual point of reference between the one or more host computers and the peripheral device. The user can still request and alter an individual private setting for the peripheral device, but the user would have to have prior knowledge to call the private setting, and would further need the know the possible range of values for that private setting and the specific effect for each value. Thus, as disclosed herein, the public setting provides a much simpler method for the altering of the private settings as the user can effect the private settings with a common protocol (possibly communicating conceptual values) with the peripheral device.

In addition, the peripheral device can return other information to accompany the public setting, such as translated text for the peripheral device, or a command for a specific panel to be displayed on the host computer. This information can be used by the one or more host computers for stored data on the peripheral devices, and such information can be utilized by the host computer to determine and manipulate individual private settings of the peripheral device. For example, translated text could be returned indicating either the range of private settings or values possible for the specific peripheral device, and the receiving host computer can store this information and reference it during additional communications with the peripheral device.

Figure 8:
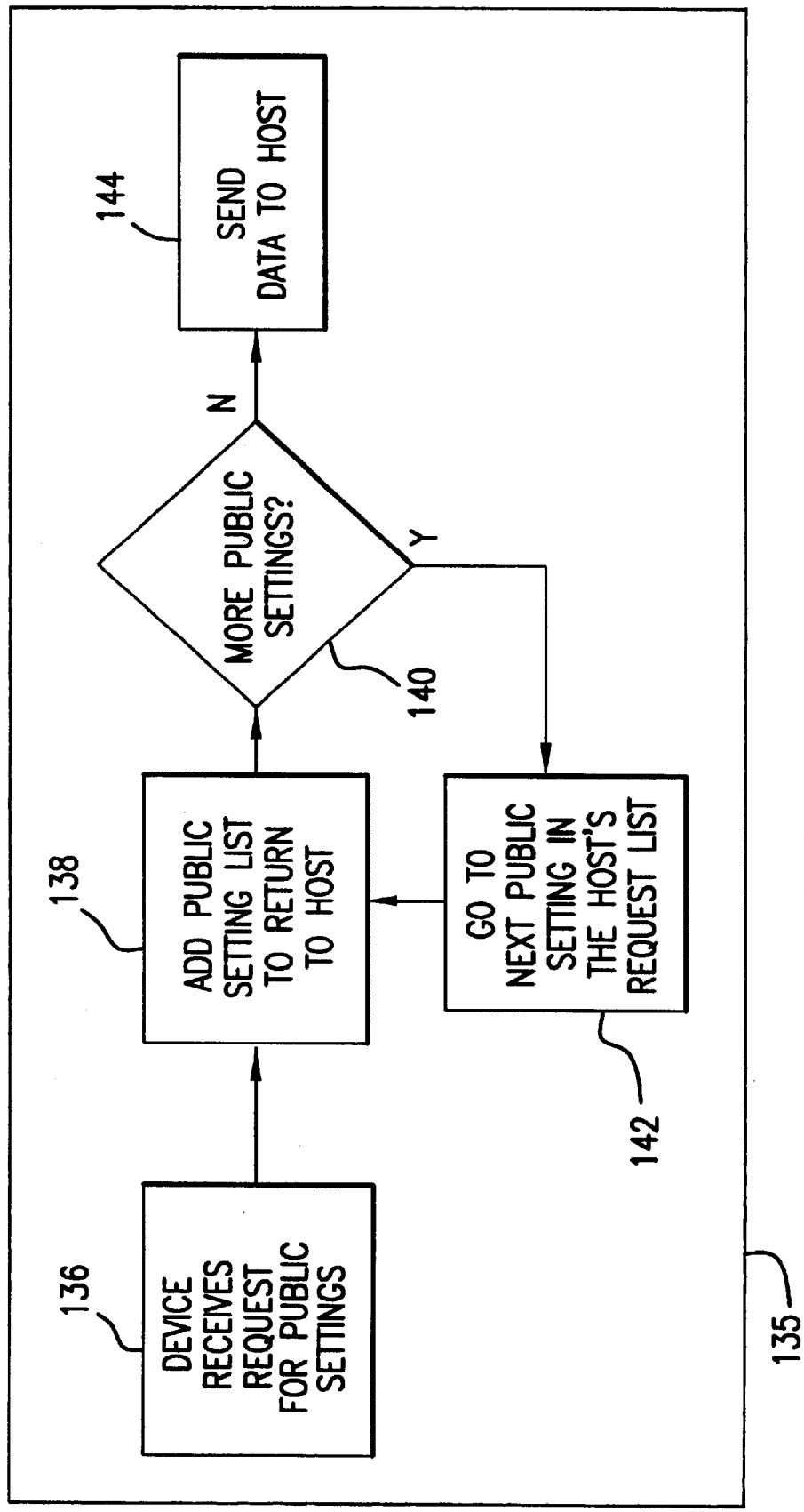
FIG. 8 is a flowchart illustrating the operation of the peripheral device in FIG. 1 upon receipt of a request from the host computer for one or more specific variables for the peripheral device.

FIG. 8 illustrates a flowchart of the operation of the peripheral device 135, such as the printer 16 in FIG. 1, upon receipt of a request from the host computer 11 for one or more specific settings for the peripheral device 135. The peripheral device 13receives the request from the host computer for the public settings of the peripheral device 135, shown at step 136, and adds the specific public setting to the list for return to the host computer, shown at step 138. Then a decision is made as to whether any more public settings are present in the specific request, shown at decision 140, and if there are additional requested public settings, then the device goes to the next public setting in the request, shown at step 142. If no further public settings are requested at decision 140, then the peripheral device 135 transmits the requested data back to the host computer 11.

FIG. 9 is a flowchart illustrating the operation of the peripheral device in FIG. 1 upon receipt of a request from the host computer 11 to update specific private settings in the peripheral device 135, such.as printer 16 in FIG. 1, with validation of the.request by the peripheral device 135. The peripheral device 135 receives the request or command from the host computer 11 to update or write the values from the host, shown at step 146, which would occur upon actuation of a command from the virtual operator panel 12 (FIG. 1) by a user to update the settings. A decision is then made as to whether the values requested are valid, public settings shown at decision 148, and if so, the specific value for the public setting is updated in the peripheral device, shown at step 150. If the value is not valid, then a second decision is made as to whether there are more public settings in the update request, shown at decision 152, and if so, the next public setting and corresponding private settings in the updating request list is obtained, shown at step 154, and a decision is again made as to whether the value is valid, at decision 148. If no more public.settings are in the request list at decision 152, then a response is returned to the host indicating that the specific public settings and corresponding private settings have been updated, or noting any errors in updating the values, shown at step 156.

Examples of the response of the printer to the host computer with the private settings or local variables of the printer (showing ranges, settings, and strings), are illustrated in human readable form as follows:
NV ID 0x0000 (Range w/o Settings)
NPA description NULL
Group ID 1 (0x00000001)
Group Description NULL
Range
Read Only
Default is Range not Index
Factory is Range not Index
Data Size 4
Start of Range 0 (0x00000000)
End of Range 4294967295 (0xFFFFFFFF)
Increment 1 (0x00000001)
Value 1564 (0x0000061C)
Factory Value 0 (0x00000000)
Number of settings 0
NV ID 0x0001 (Setting)
NPA description NULL
Group ID 3 (0x00000003)
Group Description NULL
Setting
Remote Offline Required
Data Size 1
NV Index 0
Factory Index 0
Number of settings 2
Setting Value 1 (0x01) String :PCL Emulation:
Setting, Value 2 (0x02) String :PS Emulation:
NV ID 0x0003 (Setting)
NPA description NULL
Group ID 3 (0x00000003)
Group Description NULL
Setting
Data Size 1
NV Index 0
Factory Index 0
Number of settings 2
Setting Value 1 (0x01) String :Do Not Print:
Setting Value 0 (0x00) String :Print:
NV ID 0x0004 (Setting)
NPA description NULL
Group ID 3 (0x0000003)
Group Description NULL
Setting
Data Size 1
NV Index 1
Factory Index 1
Number of settings 5
Setting Value 1 (0x01) String :Lightest:
Setting Value 2 (0x02) String :Lighter:
Setting Value 3 (0x03) String :Normal:
Setting Value 4 (0x04) String Darker:
Setting Value 5 (0x05) String Darkest:
NV ID 0x0754 (String)
NPA description NULL
Group ID 1 (0x00000001)
Group Description NULL
String
Maximum length 32 (0x0020)
String :Some text:
NV ID 0x0847 (Range w/ settings)
NPA description NULL
Group ID 47 (0x0000002F)
Group Description NULL
Range
Remote Offline Required
POR happens after setting
Data Size 4
Start of Range 3 (0x00000003)
End of Range 65535 (0x0000FFFF)
Increment 1 (0x00000001)
Value 1 (0x0000000)
Factory Value 1 (0x00000001)
Number of settings 2
Setting Value 0 (0x00000000) String :Disabled:
Setting Value 2 (0x00000002) String :Auto:

The above values would appear in the NPAP data packets as disclosed herein, or could appear in other machine readable format or code.

Figure 10:
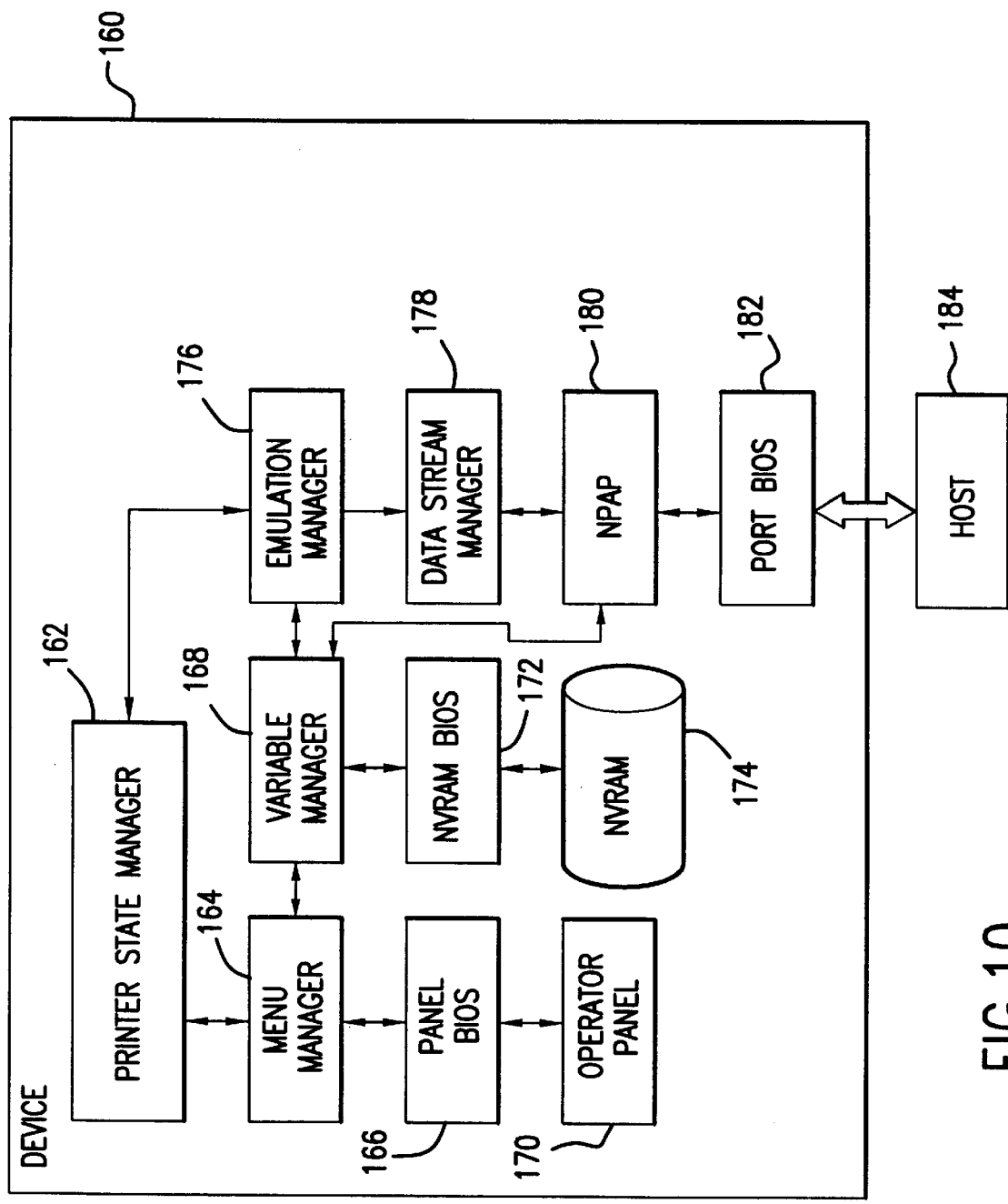
FIG. 10 is a pictorial representation of the operating system of a printer that generates metavariables to provide information to the virtual operator panel.

FIG. 10 illustrates a block diagram for the interrelation of the various components within the self-describing peripheral device 160, such as printer 16 of FIG. 1, particularly configured for usage of a metavariable as the public setting for the peripheral device. Here, the private settings are represented as private variables of the peripheral device, and a metavariable implicates one or more private variables, as shown in FIG. 11. The printer state manager 162 is in communication with the menu manager 164 and the emulation manager 176 to control the menu manager 144. The printer state manager 162 is preferably executing on the processor of the peripheral device 160. When the present invention is embodied with a host process and a peripheral device process in bidirectional communication, the peripheral device process is the printer state manager 162 operating on the computer platform of the peripheral device along with the host process. The host process can be implemented on the peripheral device platform through a download from a host computer 11, or can be native to the peripheral device platform and in such configuration, generate a virtual operator panel solely as an output of the peripheral device.

In either embodiment with bidirectional communication with a host computer 11 or a host process on the peripheral device platform, the menu manager 164 receives data from the panel BIOS 166 for the printer, which receives and sends data to the operator panel 170, if present at the peripheral device, for display to a user and allows the user to input commands back to the menu manager 164. The menu manager 164 is in communication with a variable manager 168 that interprets variables for transmission, and those received from the host computer 184 through the NPAP interface 180, such NPAP commands and data transmission described above. The variable manager 168 interacts through NVRAM BIOS 172 with the NVRAM 174 of the device 160 to have access to a menu of variables such as that illustrated in FIG. 10. The NVRAM 174 thus comprises a data store that can receive and store metavariable data for updating as well as provide the variable manager 168 with the metavariable and/or referenced variables for the menu manager 174 and ultimately the printer state manager 162 for ultimate transmission to the host computer 184, in like manner to the public setting return, for display in the virtual operator panel for the device 160. The data store can also hold additional information such as panel descriptions indicative of the public/private settings of the peripheral device, or functionality of the peripheral device, where the panel descriptions are sent to the host computer to invoke the display of a certain panel. The data store is alternately embodied as ROM, RAM, Hard or floppy disk, volatile or non-volatile memory, or any sufficient resource known in the art to send or receive data.

The variable manager 168 is likewise in communication with the emulation manager 176 to transmit data through the data stream manager 178. The data stream manger 178 uses the NPAP interface 180 to communicate across the device interface which includes the port BIOS 182 and the network or direct connection to the host 184. The NPAP interface 180 is one embodiment of the communication protocol and other computer languages and protocols, such as XML encoding, are alternately used between the devices in the interface system.

FIG. 11 illustrates a metavariable table that describes metavariables for use in an interface between the host computer and a printer. The present inventive metavariable can behave like a public setting and allow the peripheral device to relay a complex setting to the host computer for display on the virtual operator panel through the use of a single "metavariable" which implies one or more variables, or private settings, of the peripheral device. The peripheral device within the interface thus communicates self-descriptive information, examples being settings, capabilities, or device and component type, and each metavariable is preferably indicative of at least one or more parameters associated with the device. Accordingly, the parameters of the peripheral device typically comprise the relevant information for an operator panel, virtual or otherwise.

In one embodiment, the metavariable is data indicative of the configuration and settings of a device, such as the META_VARIABLE settings illustrated in the sample table of FIG. 10. For every META_SETTING, there will be two or more variable settings indicated such that SETTING#1_VALUEa. . . SETTING#n_VALUEx. Accordingly, the metavariable is alternately a command which can originate from actuation of a push button on the virtual operator panel, which alters two or more settings of the device upon receipt of the metavariable by the device. Examples of the commands are the metavariables for print quality adjusting the print quality of the individual printer upon the receipt of the metavariable by the printer. Additionally, the metavariable can be data indicative of two or more application settings of a device, an example being the variables required to perform a specific print job.

Since the metavariable can affect one or more related variables for the specific device, the variables and settings for those variables needed to be properly referenced for each metavariable. Thus, FIG. 11 shows metavariables that include the term "META" which are implemented on the command menus of Lexmark printers Optra Color C710, Optra W180, and OptraT*. It is shown that the settings (and every variable involved) for PRINT QUALITY change from printer to printer, however, the NVMETA metavariable can indicate or reference the variables for print quality regardless of the actual syntax of the individual variables. As an example, for the Optra W180, the metavariable NVMETA_PQ1200IMAGEQ references or implies the variable NV600DPI for the beginning and ending resolutions and NV_ON for the NV_NVIET function.

As shown in the table for the Optra T*, the 'SPLAT' concept is used when the setting of an individual variable does not matter for the particular metavariable. Because the table is searched in order, the SPLAT case can be used to ensure a setting is returned for the metavariable when the printer gets into an ill-defined state.

The tables of FIG. 11 are preferred to be resident in the data store of the interfaced peripheral device. However, the table can alternatively be solely in the data store of one device, such as a host computer, and another device, such as a printer, can access the table though the interface and copy the table to a local memory. Further, the actual variables implied by the metavariable(s) can be wholly derived from the actual variables that comprise the metavariable at the initialization of the system. This removes the necessity of storing metavariables in the actual storage media, such as NVRAM, thus conserving a scarce resource.

Moreover, the metavariable preferably constitutes either a specific predefined setting that appears on the virtual operator panel 12, or the metavariable can constitute a panel description for the virtual operator panel 12. It is preferred that each metavariable is represented as a pushbutton, such as 40a–40d in FIGS. 1 and 2, such that the metavariable affects and is affected by the specific push button on the GUI interface. Further, the metavariable can implicate a specific panel description for the virtual operator panel 12, an example being a paper jam signal being sent from the printer 16 to the host computer 11 generating an alert screen and interface on the virtual operator panel 12. If the host process is executing on the peripheral device platform, the metavariable can cause the host process to select a panel description for display and the specific GUI display for the virtual operator panel 12 can be generated from the peripheral device platform.

The usage of private settings or local variables of the peripheral device into a metavariable gives a developer the ability to easily create new variables or new concepts, and add new settings to existing variables that can be referenced by a single metavariable to ensure that the private settings for implementation of the metavariable are correct. And because the variable manager provides a consistent interface through which to read and write private settings or local variables with the simpler metavariable, the rest of the device interface system can easily determine the configuration or value/state of the device for even a complicated machine state, and can display the accurate configuration on the virtual operator panel.

The peripheral device-host interface accordingly treats each metavariable as a single, simple variable or public setting of the peripheral device in transmission and interpretation. The menu manager code for each device preferably displays text for each metavariable in the same manner as each public setting, and host computers or processes can therefore request the public settings on metavariables to either learn of the state of the machine for display or implement a metavariable command from the display. However, the metavariable does not require selection of a menu node because the metavariable can only change settings in the device, and generally each setting has an individual variable that can be altered separately from the metavariable. However, when a menu node is selected, the peripheral device may need to update a file in addition to altering the variables in memory. This ability allows the individual settings for variables referenced by the metavariable to vary from device to device with an update occurring at the time of receipt of the metavariable.

It can be seen that the metavariable allows several levels of abstraction of device communication across an interface. The metavariable can be a single real concept such as the print quality being 300 dots per inch (DPI), which requires referencing multiple variables in the device to permit use of the metavariable as a command to correctly change the underlying hardware to function properly.

The metavariable can alternately be a complex, abstract conceptual setting such as "Conserve Resources." The conceptual setting of 'Conserve Resources' necessarily varies from device to device; on a laser printer it might mean: duplex, 2-up, and toner-saver mode; and on a computer it might mean: sleep after 10 minutes of inactivity. The metavariable consequently gives the developer the ability to create an intuitive command hierarchy of metavariables that are simpler to understand in function without full knowledge of the individual variables. Each of the conceptual settings can be represented in a single push button on the virtual operator panel and actuation of the push button can transmit the metavariable to the printer such that the requisite variables are changed in accordance with the command.

Moreover, the name or concept represented by a given metavariable controlling one or more variables in one device can control or affect a single native variable in a different device, or a variable for a specific parameter of that device, which allows for cross-device capability of virtual operator panel generation. A metavariable can thus imply only one native variable when received by the peripheral device, but that native variable can vary from device to device, being one native variable in one device and several native variables on another device.

Furthermore, while multiple metavariables can control a single native variable or private settings, each metavariable can have different properties. For example, the concept of "image enhancement" controls various image manipulations that are performed in a printer on a page. Some printers utilize processes or tasks that allow the user to be able to change this setting, while another printer provides the capability to report the image enhancement settings current value to the user. Consequently, the underlying variables for the metavariable affecting image enhancement can alter many device settings in one device, and simply generate a report in another device, which is typically accomplished by one variable.

Accordingly, in one embodiment, the present invention is a system for providing the virtual operator panel 12 for a peripheral device, such as printer 16, in an interface with host computer 11, where the system includes a peripheral device having a processor, such as printer state manager 162 (FIG. 10), and a data store, such as NVRAM 174, that stores peripheral device settings including one or more public settings or metavariables, when the public setting or metavariable indicative of one or more private settings of the peripheral device, and at least one host computer in bidirectional communication with the peripheral device. The host computer likewise has a data store, a display 13 and a processor, and selectively transmits a request to the peripheral device requesting public settings of the peripheral device for generation of a virtual operator panel for the peripheral device on the display of the host computer. The peripheral device then receives the request for peripheral device settings from the host computer and transmits a response, including one or more public settings or metavariables, from the data store of the peripheral device. And the host computer 11 receives the response, including the public settings or metavariable, from the peripheral device and generates a virtual operator panel 12 based upon the response.

The peripheral device processor alternately transmits a response including a plurality of public settings or metavariables, and the host computer processor selects a panel description based upon the public settings or metavariables included in the received response. The peripheral device processor then retrieves the public settings or metavariables from the peripheral device data store and includes the retrieved public settings or variables in the response.

As shown in FIGS. 1 and 2, the virtual operator panel on the display of the host computer preferably includes graphical representations of interactive controls for the peripheral device, and allows a user to actuate a graphical interactive control on the virtual operator panel to change settings on the peripheral device. In such embodiment, the public setting or metavariable preferably represents a predefined setting on the virtual operator panel. When the interactive control is actuated, the host computer then transmits a command to the peripheral device including the public setting or metavariable implicated by the specific actuated interactive control to the peripheral device. The peripheral device processor then receives the command from the virtual operator panel of the host computer and actuates peripheral device functionality in accordance with the command. The peripheral device processor also preferably further transmits updated setting information including one or more public settings or metavariables back to the host computer once the desired functions are altered on the peripheral device for updating of the virtual operator panel.

As discussed above, when the peripheral device is embodied as a printer, the host computer and printer preferably communicate using NPAP Protocol. Alternately, the host computer and peripheral device communicate using XML encoding. Other protocols and languages as known in the art are alternately used for communication between the host computer and peripheral device.

In a further embodiment, the peripheral device selectively transmits an alert signal including one or more public settings or metavariables to one or more connected host computers in response to a triggering event in the peripheral device. The alert signal causes generation of the virtual operator panel on the display of the host computer to alert the user preferably with a warning including the one or more public settings of the peripheral device as shown in FIG. 3. Such alert typically occurs for such instances as paper jams, paper supply exhaust, or the requirement of toner/ink replenishment.

The host computer 11 is alternately a second peripheral device in communication with the peripheral device generating a virtual operator panel. Alternately, the peripheral device is a second host computer in communication with a host computer generation a virtual operator panel.

In another embodiment, the invention is a peripheral device generating a virtual operator panel, such as virtual operator panel 12, where the peripheral device has a processor, which would include printer state manager 162, for running at least a host process and a device process on the peripheral device platform. The peripheral device has a data store, such as NVRAM 174, that stores public settings or metavariables in relation to the one or more private settings or local variables of the peripheral device that each public setting or metavariable implicates. The host process selectively generates a request for peripheral device public settings, as is shown in FIGS. 8 and 9, for generation of a virtual operator panel for the peripheral device to the device process, and the device process retrieves one or more public settings or metavariables indicative of the private settings of the peripheral device and transmits the public settings or metavariables to the host process.

Thus, when the virtual operator panel generated by the host process includes graphical representations of interactive controls for the peripheral device on the virtual operator panel, the actuation of a specific graphical interactive control causes the host process to transmit a command to the device process including the public setting or metavariable implicated by the specific actuated interactive control. The device process then receives the command from the virtual operator panel of the host process and actuates peripheral device functionality in accordance with the command. Alternately, the device process can then transmit updated setting information including one or more public settings or metavariable to the host process for updating of the virtual operator panel after actuating peripheral device functionality.

In like manner to the host computer-peripheral device communication, the host process and the device process preferably communicate through NPAP Protocol. Alternately, the host process and the device process communicate through XML encoding or any other protocol or language as known in the art.

The present inventive system thus provides an inventive method for generating a virtual device operator panel 12 for a peripheral device, such as printer 16, including the steps of transmitting a request for peripheral device settings from a host computer 11 to a peripheral device, receiving the request for peripheral device settings at the peripheral device. Then the method includes the steps of generating a response in the peripheral device where the response includes one or more public settings or metavariables indicative of one or more parameters of the peripheral device, as shown in FIGS. 7–11, and then transmitting the response from the peripheral device to the host computer 11, receiving the response from the peripheral device at the host computer 11; and generating a functional virtual operator panel 12 on a display 13 at the host computer 11 based upon the public settings or metavariables included in the received response.

The method alternately further includes the step of selecting a panel description from a plurality of panel descriptions, preferably in the data store of the peripheral device, where each panel description includes one or more public settings or metavariables, prior to the step of transmitting the response from the peripheral device. Then the step of generating the virtual operator panel is generating the virtual operator panel with the panel description from the peripheral device.

The method alternately further includes the steps of retrieving a panel description from the peripheral device data store, and including the retrieved panel description in the response transmitted to the host computer., Then the step of generating a response in the peripheral device, where the response includes one or more public settings or metavariables indicative of one or more parameters of the peripheral device is generating a response in the peripheral device where the response includes one or more public settings or metavariables representing a predefined setting on the virtual operator panel 12.

If the virtual operator panel 12 is embodied on the display 3 of the host computer 11 as including graphical representations of interactive controls for the peripheral device, such as those shown in FIGS. 2 and 3, then the method further includes the steps of transmitting a command from the host computer 11 to the peripheral device. The command preferably includes a metavariable implicated by the specific actuated interactive control such that the step of transmitting the command occurs upon a user actuating a graphical interactive control on the virtual operator panel 12. Then the method further preferably includes the steps of receiving the command from the virtual operator panel 12 of the host computer 11 at the peripheral device processor, and actuating peripheral device functionality in accordance with the command received. And then the method further preferably includes the steps of transmitting from the peripheral device processor updated setting information including one or more public settings or metavariables to the host computer, such as shown in FIG. 9, and updating the virtual operator panel 12 with the setting information.

If the peripheral device is a printer, such as printer 16, then the steps of transmitting a request for peripheral device settings from a host computer 11 to a peripheral device, and transmitting the response from the peripheral device to the host computer preferably occur through an NPAP Protocol. Alternately, the steps of transmitting a request for peripheral device settings from a host computer to a peripheral device, and transmitting the response from the peripheral device to the host computer occur through XML encoding.

When the present inventive system is embodied as a host process and device process in bidirectional communication on a the platform of the peripheral device, the preferred method for generating a virtual device operator panel 12 for a peripheral device includes the steps of transmitting a request for peripheral device settings from the host process to the device process, and receiving the request for peripheral device settings at the device process. The method then includes the step of generating a response from the device process, where the device process is in communication with a data store of the peripheral device and the data store including metavariables in relation to the one or more private settings or local variables of the peripheral device that each public setting or metavariable implicates, and the response including one or more public settings or metavariables indicative of one or more parameters of the peripheral device. Then the method includes the steps of transmitting the response from the device process to the host process, receiving the response from the device process at the host process, and generating a functional virtual operator panel, such as virtual operator panel 12, from the host process based upon the one or more public settings or metavariables included in the received response.

The method alternately further includes the step of selecting a panel description from a plurality of panel descriptions in the data store of the peripheral device, where each panel description includes one or more public settings or metavariables, such selection prior to the step of transmitting the response from the device process. Then the step of generating the virtual operator panel 12 is generating the virtual operator panel 12 with the panel description from the device process. Then the method preferably include the steps of retrieving a panel description from the peripheral device data store, such retrieval being accomplished by the device process, and including the retrieved panel description in the response transmitted to the host process.

The step of generating a response from the device process, where the response includes one or more public settings or metavariables indicative of one or more parameters of the peripheral device, is preferably generating a response from the device process where the response includes at least one or more public settings or metavariables representing a predefined setting on the virtual operator panel.

If the generated virtual operator panel includes graphical representations of interactive controls for the peripheral device, such as in FIG. 2, the method further includes the steps of transmitting a command from the host process to the device process, where the command includes the public setting or metavariable implicated by the specific actuated interactive control, receiving the command from the virtual operator panel of the host process at the device process, and actuating peripheral device functionality in accordance with the command received, such actuation occurring through the device process. The method then preferably further includes the steps of transmitting from the device process updated setting information including one or more public settings or metavariables to the host process, and updating at the host process the virtual operator panel with the setting information for the updated settings of the peripheral device.

If the peripheral device upon which the host process and device process are occurring is a printer, then the steps of transmitting a request for peripheral device settings from a host process to a device process, and transmitting the response from the device process to the host process preferably occur through NPAP Protocol. Alternately, the steps of transmitting a request for peripheral device settings from a host process to a device process, and transmitting the response from the device process to the host process occurs through XML encoding, or any other language or protocol as known in the art.

While there has been shown a preferred and alternate embodiments of the present invention, it is to be understood that certain changes may be made in the forms and arrangements of the components and steps of the inventive method without departing from the spirit and scope of the invention as set forth in the claims appended herewith.

What is claimed is:

1. A system for providing a virtual operator panel for a peripheral device in an interface with a host computer, the system comprising:

a peripheral device including a processor and a data store that stores public settings and corresponding private settings of the peripheral device, each public setting indicative of at least one private setting of the peripheral devices;

at least one host computer in bidirectional communication with the peripheral device, the host computer including a data store, a display and a processor, the host computer selectively transmitting a request to the peripheral device requesting public settings of the peripheral device for generation of a virtual operator panel for the peripheral device on the display of the host computer;

wherein the peripheral device receives a request for peripheral device settings from the host computer and obtains the public setting of the peripheral device, based upon the private settings of the peripheral device to implement the public setting of the peripheral device, and transmits a response including one or more public settings from the data store of the peripheral device; and wherein the host computer receives the response including one or more public settings from the peripheral device and generates a virtual operator panel based upon the response.

2. The system of claim 1, wherein the peripheral device processor transmits a response including a plurality of public settings, and wherein the host computer processor selects a panel description from the received response.

3. The system of claim 1, wherein the peripheral device processor retrieves the public setting from the peripheral device data store and includes the retrieved public setting in the response.

4. The system of claim 1, wherein each public setting represents a predefined setting on the virtual operator panel.

5. The system of claim 4, wherein the virtual operator panel on the display of the host computer includes graphical representations of interactive controls for the peripheral device, and upon a user actuating a graphical interactive control on the virtual operator panel, the host computer transmits a command to the peripheral device including the public setting implicated by the specific actuated interactive control.

6. The system of claim 5, wherein the peripheral device processor receives the command from the virtual operator panel of the host computer and actuates peripheral device functionality in accordance with the command.

7. The system of claim 6, wherein the peripheral device processor further transmits updated setting information including at least one public setting to the host computer for updating of the virtual operator panel.

8. The system of claim 1, wherein the host computer and peripheral device communicate using NPAP Protocol.

9. The system of claim 1, wherein the host computer and peripheral device communicate using XML encoding.

10. The system of claim 1, wherein the peripheral device selectively transmits an alert signal including at least one public setting to one or more connected host computers in response to a triggering event in the peripheral device, such alert signal causing generation of the virtual operator panel on the display of the host computer.

11. The system of claim 1, wherein the host computer is a second peripheral device.

12. The system of claim 1, wherein the peripheral device is a second host computer.

13. A method for generating a virtual device operator panel for a peripheral device, comprising the steps of:

transmitting a request for peripheral device public settings from a host computer to a peripheral device;

receiving the request for peripheral device public settings at the peripheral device;

generating a response in the peripheral device, the response including one or more public settings, each said public setting defining one or more private settings of the peripheral device to implement the public setting defining said private settings;

transmitting the response from the peripheral device to the host computer;

receiving the response from the peripheral device at the host computer; and generating a functional virtual operator panel on a display at the host computer based upon the one or more public settings included in the received response.

14. The method of claim 13, wherein:

the step of generating a response in the peripheral device, the response including one or more public settings each indicative of one or more private settings of the peripheral device is generating a response in the peripheral device, the response including one or more metavariables each indicative of one or more local variables of the peripheral device; and the step of generating a functional virtual operator panel on a display at the host computer based upon the one or more public settings included in the received response is generating a functional virtual operator panel on a display at the host computer based upon the one or more metavariables included in the received response.

15. The method of claim 14, wherein the peripheral device selects a panel description from a plurality of panel descriptions in the data store of the peripheral device, each panel description including one or more public settings, prior to the step of transmitting the response from the peripheral device, and wherein the step of generating the virtual operator panel is generating the virtual operator panel with the panel description from the peripheral device.

16. The method of claim 15, wherein the steps of transmitting a request for peripheral device settings from a host computer to a peripheral device, and transmitting the response from the peripheral device to the host computer occur through NPA Protocol.

17. The method of claim 15, wherein the steps of transmitting a request for peripheral device settings from a host computer to a peripheral device, and transmitting the response from the peripheral device to the host computer occurs through XML encoding.

18. The method of claim 13, further comprising the steps of:

retrieving a panel description from the peripheral device data store; and including the retrieved panel description in the response transmitted to the host computer.

19. The method of claim 13, wherein the step of generating a response in the peripheral device, the response including one or more public settings each indicative of one or more private settings of the peripheral device is generating a response in the peripheral device, the response including at least one metavariable representing a predefined setting on the virtual operator panel.

20. The method of claim 19, wherein the virtual operator panel on the display of the host computer includes graphical representations of interactive controls for the peripheral device, and further including the step of transmitting a command from the host computer to the peripheral device, the command including the metavariable implicated by the specific actuated interactive control, and the step of transmitting the command occurring upon a user actuating a graphical interactive control on the virtual operator panel.

21. The method of claim 20, further including the steps of receiving the command from the virtual operator panel of the host computer at the peripheral device processor; and actuating peripheral device functionality in accordance with the command received.

22. The method of claim 21, further including the steps of:

transmitting from the peripheral device processor updated setting information including at least one metavariable to the host computer; and updating the virtual operator panel with the setting information.

23. A peripheral device generating a virtual operator panel, comprising:

a peripheral device having a processor for running at least host process and a device process;

a data store of the peripheral device that stores public settings, each said public setting defining one or more private settings of the peripheral device to implement the public setting defining said private settings; and wherein the host process selectively generates a request for device settings for generation of a virtual operator panel for the peripheral device to the device process, and the device process retrieves one or more public settings indicative of the private settings of the peripheral device and transmits the one or more public settings to the host process.

24. The device of claim 23, wherein the host process generates a virtual operator panel in response to receipt of the one or more public settings from the peripheral device.

25. The device of claim 24, wherein the host process updates an existing virtual operator panel in response to receipt of the one or more public settings from the device process.

26. The device of claim 25, wherein each public setting represents a predefined setting on the virtual operator panel.

27. The device of claim 26, wherein the virtual operator panel generated by the host process includes graphical representations of interactive controls for the peripheral device, and upon actuation of a graphical interactive control on the virtual operator panel, the host process transmits a command to the device process including one or more public settings implicated by the specific actuated interactive control.

28. The device of claim 27, wherein the device process receives the command from the virtual operator panel of the host process and actuates peripheral device functionality in accordance with the command.

29. The device of claim 23, wherein the public settings are each metavariables implicating one or more local variables of the peripheral device.

30. The device of claim 23, wherein the host process and the device process communicate through NPAP Protocol.

31. The device of claim 23, wherein the host process and the device process communicate through XML encoding.

32. A method for generating a virtual device operator panel for a peripheral device, comprising the steps of transmitting a request for peripheral device public settings from a host process to a device process;

receiving the request for peripheral device public settings at the device process;

generating a response from the device process, the device process in communication with a data store of the peripheral device and the data store including public settings, each said public settings defining one or more private settings of the peripheral device to implement the public setting defining said private settings, the response including one or more of said public settings;

transmitting the response from the device process to the host process;

receiving the response from the device process at the host process; and generating a functional virtual operator panel from the host process based upon the one or more public settings included in the received response.

33. The method of claim 32, further comprising the step of selecting a panel description from a plurality of panel descriptions in the data store of the peripheral device, each panel description including one or more private settings, prior to the step of transmitting the response from the device process, and wherein the step of generating the virtual operator panel is generating the virtual operator panel with the panel description from the device process.

34. The method of claim 33, further comprising the steps of:

retrieving a panel description from the peripheral device data store, such retrieval accomplished by the device process; and including the retrieved panel description in the response transmitted to the host process.

35. The method of claim 33, wherein the generated virtual operator panel includes graphical representations of interactive controls for the peripheral device, and further including the step of transmitting a command from the host process to the device process, the command including one or more public settings implicated by the specific actuated interactive control.

36. The method of claim 35, further including the steps of:

receiving the command from the virtual operator panel of the host process by the device process; and actuating peripheral device functionality in accordance with the command received, such actuation occurring through the device process.

37. The method of claim 36, further including the steps of:

transmitting from the device process updated setting information including one or more public settings to the host process; and updating at the host process the virtual operator panel with the public setting information.

38. The method of claim 32, wherein the step of generating a response from the device process, the response including one or more public settings indicative of one or more private settings of the peripheral device is generating a response from the device process where the response includes one or more public settings representing a predefined setting on the virtual operator panel.

39. The method of claim 32, wherein the steps of transmitting a request for peripheral device public settings from a host process to a device process, and transmitting the response from the device process to the host process occur through NPAP Protocol.

40. The method of claim 32, wherein the steps of transmitting a request for peripheral device public settings from a host process to a device process, and transmitting the response from the device process to the host process occurs through XML encoding.

* * * * *